United States Patent [19]

Sherman, III et al.

[11] Patent Number: 4,671,502

[45] Date of Patent: Jun. 9, 1987

[54] METHOD AND APPARATUS FOR COUNTING SHEETS WHICH MAY BE FED IN SKEWED AND/OR OVERLAPPING FASHION

[75] Inventors: William Sherman, III, Medford; Francis C. Larkin, Trenton, both of N.J.; Stephen J. Horvath, Bensalem, Pa.

[73] Assignee: Brandt, Inc., Bensalem, Pa.

[21] Appl. No.: 839,617

[22] Filed: Mar. 14, 1986

Related U.S. Application Data

[62] Division of Ser. No. 440,584, Nov. 10, 1982.

[51] Int. Cl.[4] .............................................. G06M 7/06
[52] U.S. Cl. .......................................... 271/4; 377/8;
271/154; 271/259; 271/265
[58] Field of Search ............... 271/10, 152, 153, 154,
271/265, 266, 3, 4, 258, 259, 270; 377/8, 112

[56] References Cited

U.S. PATENT DOCUMENTS

| 3,804,512 | 4/1974 | Komori et al. | 271/170 |
|---|---|---|---|
| 4,097,732 | 6/1978 | Krause et al. | 250/205 |
| 4,307,957 | 12/1981 | Kitagawa et al. | 271/258 |
| 4,444,382 | 4/1984 | Ishikawa et al. | 271/10 |
| 4,474,365 | 10/1984 | Di Blasio | 271/116 |

*Primary Examiner*—Stanley D. Miller
*Assistant Examiner*—Karl Ohralik
*Attorney, Agent, or Firm*—Shenier & O'Connor

[57] ABSTRACT

Sensors in the infeed and output stackers, under control of the microprocessor, monitor the sheets. The apparatus is started automatically by placing sheets in the infeed. A count of the sheets is developed and displayed as the sheets are fed. When the infeed is empty and the output contains sheets, the count is retained. If sheets are removed from the outfeed, the count is retained and is reset only after more sheets are placed in the input. The same rules obtain for batching. The sensors cooperate with singles, holes and doubles detectors and have their gain adjusted depending upon sheet density. Automatic threshold adjustment circuits compensate for dust build-up and component aging. Upon sheet detection, the sensing circuit threshold level is instantaneously shifted to prevent an abrupt change in intensity from the sheet covering the sensor to provide an erroneous indication of the presence of a subsequent sheet or sheets. The sensors assure accurate counting even though sheets are fed in skewed and/or overlapping fashion. An amplifier normally in saturation is driven out of saturation when light intensity drops to increase the ability to determine the transmissivity to distinguish between single and double sheets. Operating speed may be reduced from normal speed. All timing is automatically readjusted according to the selected operating speed. The control circuitry may be coupled to and synchronized with a denominations counter and printer. The doubles detection circuit may also discriminate between two and three overlapped sheets.

17 Claims, 43 Drawing Figures

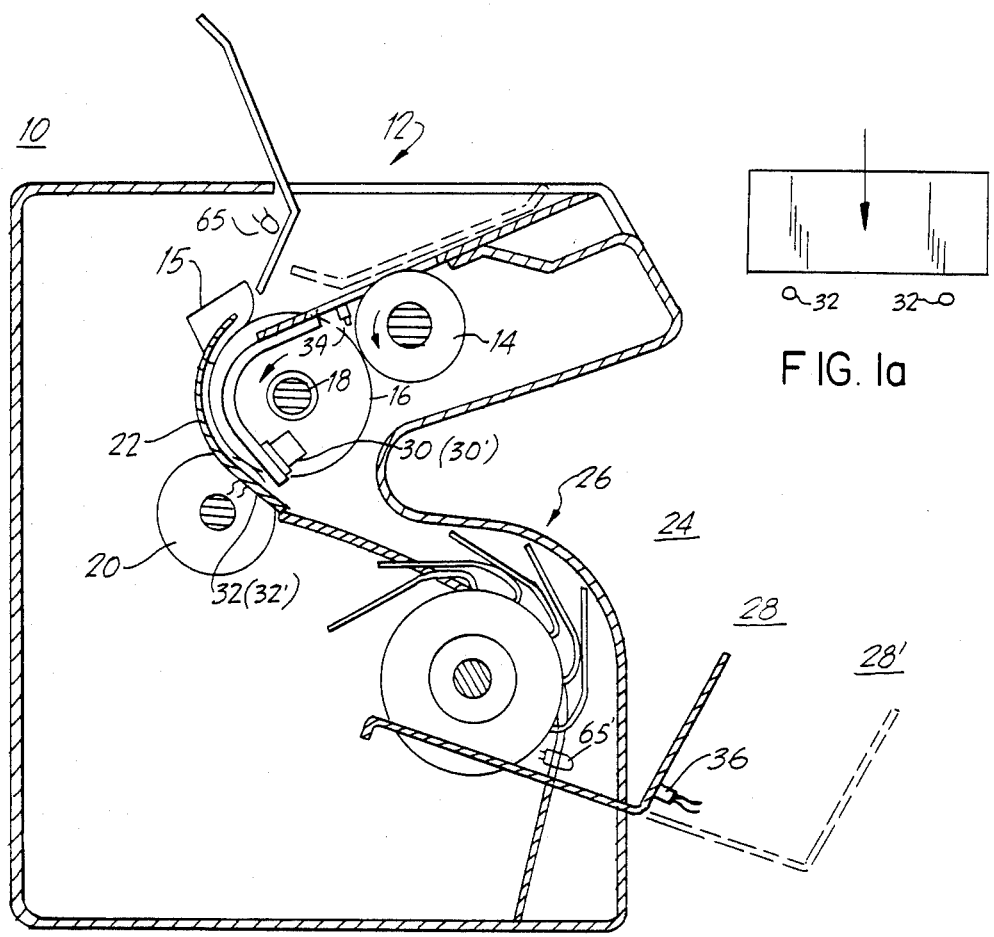
FIG. 1a
FIG. 1
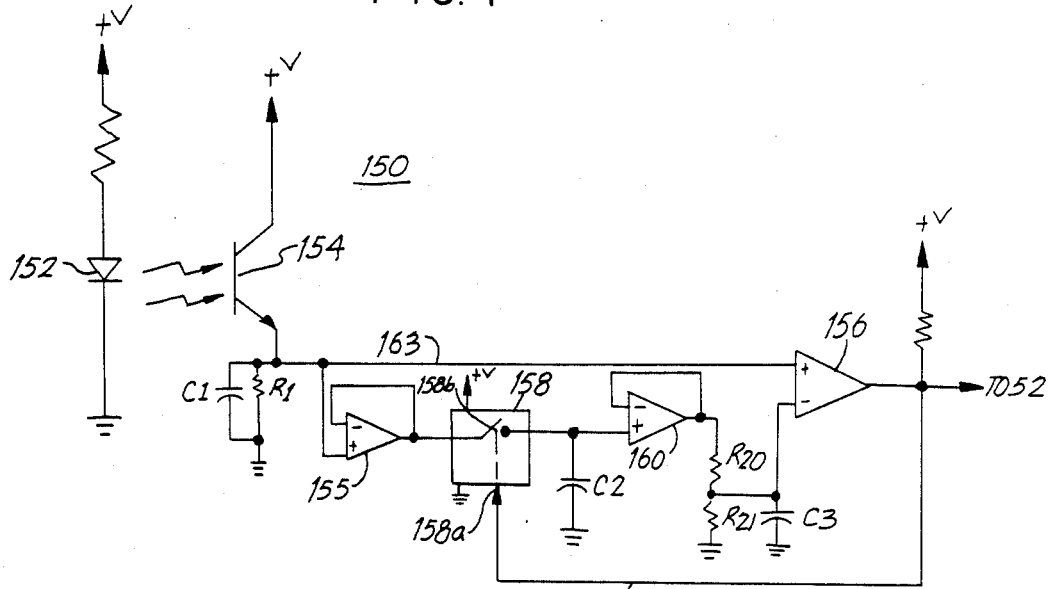
FIG. 2a

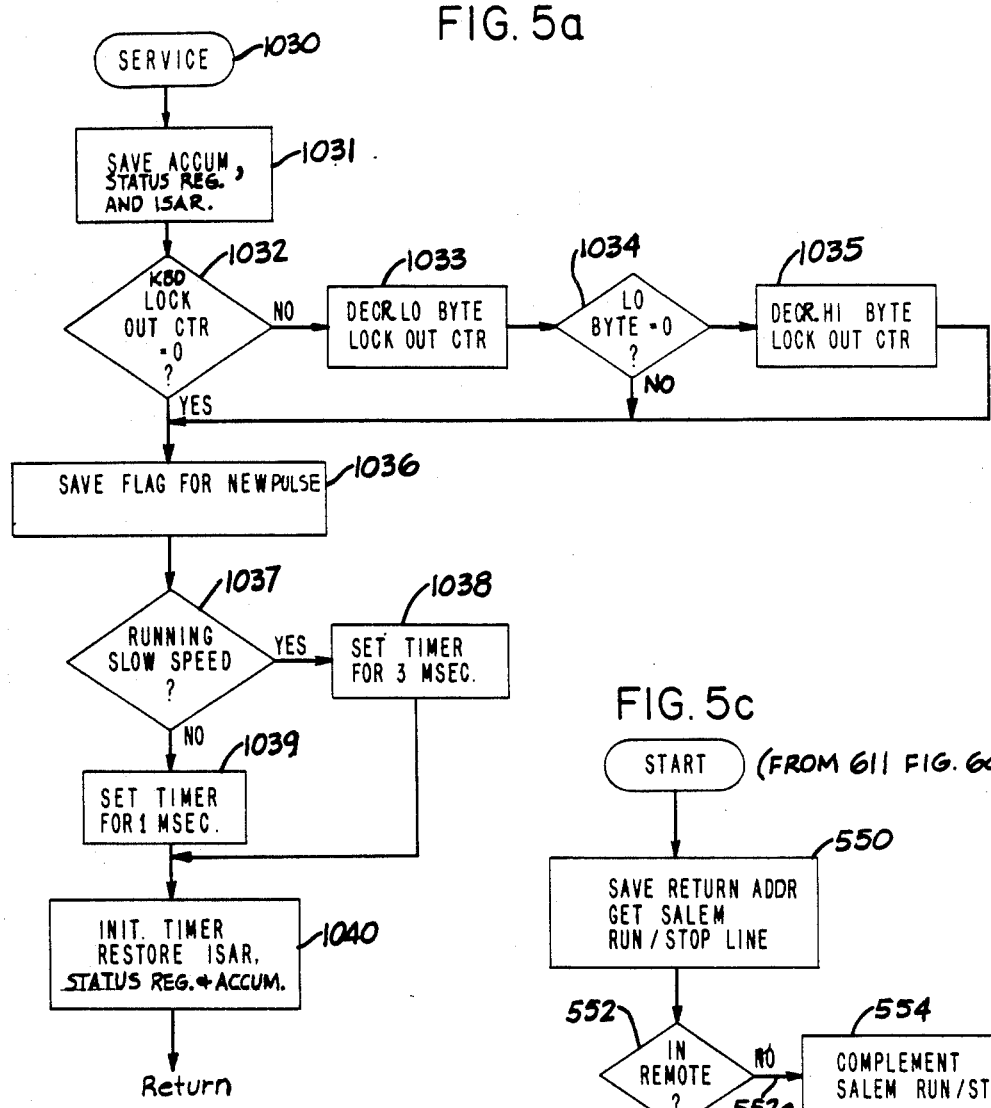
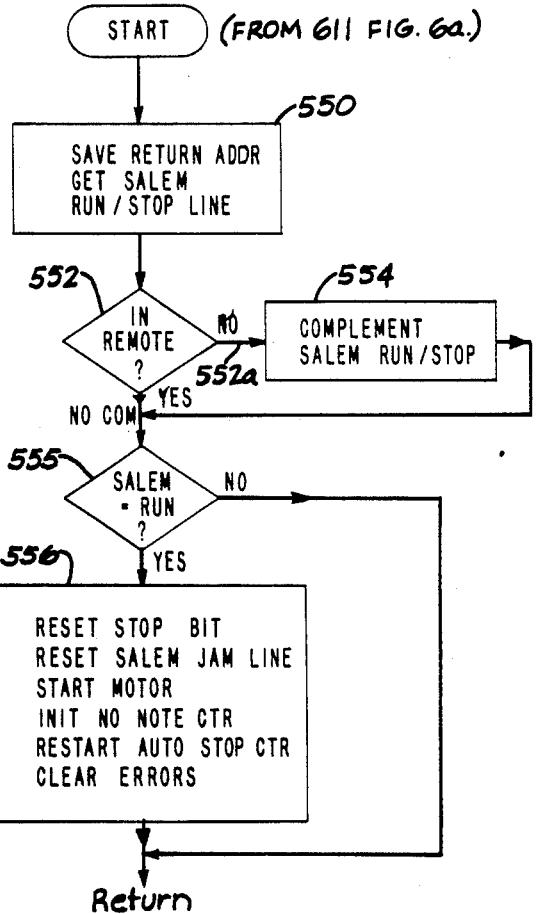
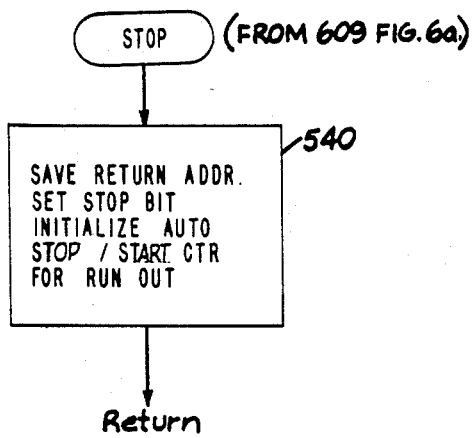

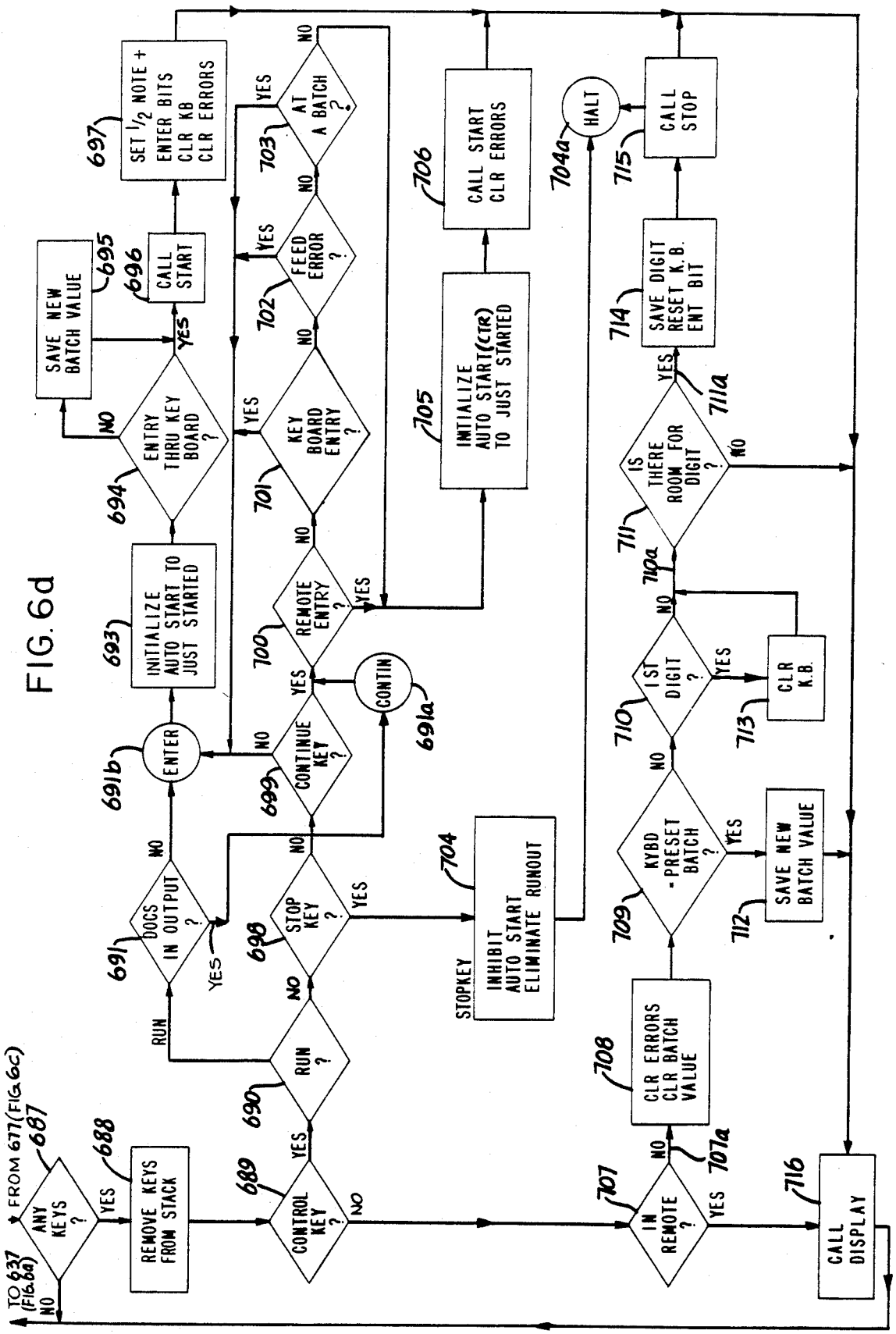

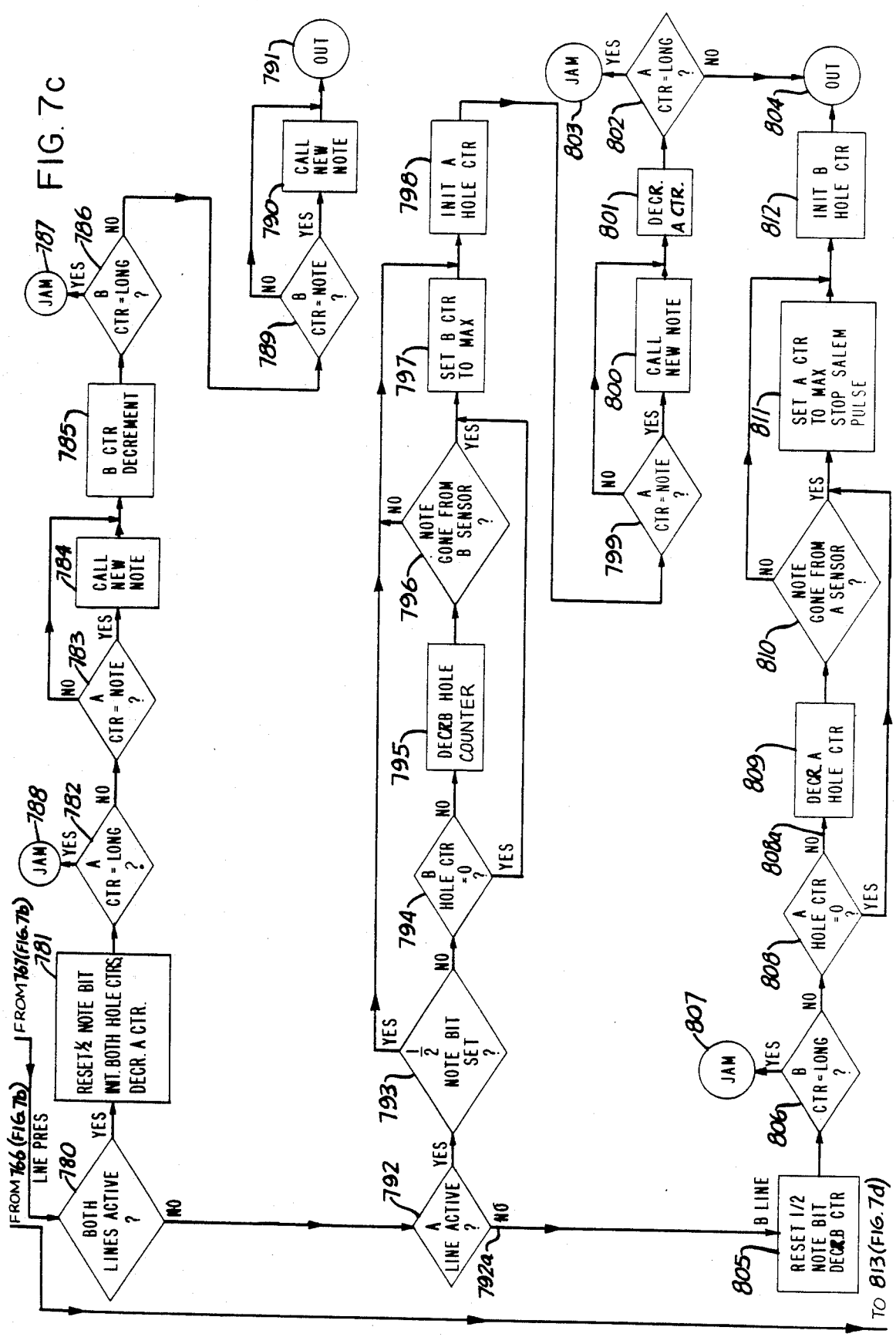

METHOD AND APPARATUS FOR COUNTING SHEETS WHICH MAY BE FED IN SKEWED AND/OR OVERLAPPING FASHION

This is a division of application Ser. No. 440,584, filed Nov. 10, 1982.

FIELD OF THE INVENTION

The present invention relates to document handling and counting apparatus and more particularly to novel microprocessor-based control means to provide substantially automatic operation of such apparatus during both normal counting and batching operations and for significantly enhancing the sensitivity and capability of the system for detecting the presence of multiple-fed sheets thereby enabling the accurate counting of sheets fed in a skewed and/or overlapping manner.

BACKGROUND OF THE INVENTION

Present day document handling and counting apparatus have the capability of accurately handling and counting sheets at high speed. Typically, sheets placed in an infeed hopper are separated from a stack fed on a one-at-a-time basis and at spaced intervals, the difference in transmissivity of the gap between separated sheets and the sheets themselves being utilized for counting purposes. Present day handling and counting apparatus typically operates under control of manually operable switches and buttons to perform the desired operations. For example, the apparatus is normally turned on by operating an on/off switch to the on position and operating a start switch or button to turn on the document handling apparatus. Sheets placed in the infeed hopper are separated, counted and collected at an output stacker. During normal counting, the count developed in a display counter will be retained until it is manually reset. Thus, for example, the sheets placed in the infeed hopper are separated, counted and delivered to the output stacker. If the contents of the output stacker are removed and again placed into the infeed hopper, the count will be double that of the original count, unless the count has been manually reset. Aslo the handling apparatus will not be turned off unless a stop button is operated.

When counting sheets in present day apparatus, unless the sheets are accurately aligned, the feeding of sheets in a skewed manner will yield an erroneous count. In addition, even among those document handling and counting devices presently capable of detecting the presence of double-fed sheets, it is extremely difficult to differentiate between two clean double-fed sheets and one dirty sheet. This capability is of great value in the counting of paper currency.

BRIEF DESCRIPTION OF THE INVENTION

The present invention is characterized by comprising a document handling and counting apparatus in which microprocessor-based control means is provided for automating operations of the document counting and handling apparatus not hereto provided for in presently available apparatus, and further having singles and doubles detection apparatus which significantly increases the sensitivity of the system to facilitate distinguishing between single-fed and double-fed sheets.

The present invention is characterized by comprising sensors arranged in the input hopper and output stacker and which, under control of a microprocessor, substantially automatically control the operation of the document handling and counting apparatus.

The document handling and counting apparatus may be of the type described in copending application Ser. No. 288,646 filed July 30, 1981, which application is assigned to the assignee of the present invention. The control means turns on the document handling apparatus when the stack of sheets is placed in the input hopper and the unit will either start automatically or when the start button is depressed, to begin operation. During a normal counting operation, when sheets are counted and delivered to the output stacker and the input hopper is emptied, the handling apparatus is turned off, but the count is retained. So long as the counted sheets have not been removed from the output stacker, when the sensor again detects the presence of sheets in the input hopper, the handling apparatus is again activated and counting automatically continues, whereupon the count of the second group of sheets placed in the input hopper is added to the pre-existing count of the first group of sheets. When the input is empty, counting stops. However, the count remains displayed. If documents are placed in the input while documents are still in the output, the count accumulates. If documents are placed in the input when the output has previously been emptied, the count resets when the documents are set into the input, i.e. the count remains displayed after documents are removed from the output and is not cleared until documents are placed in the input. Delays are provided at turn on and turn off to give the operator time to insert (or remove) a stack of sheets and remove the operator's hands from the machine.

The control apparatus operates in a similar manner during a batch mode whereupon any incomplete batch removed from the output stacker when the input hopper is empty, automatically resets the count of the portion of the batch which has been counted. If the sheets of a partial batch are not removed and sheets are placed in the infeed hopper, counting automatically continues. Thus, once the apparatus has been turned on, there is no further need to activate any manually operable buttons or switches to further automate the operation of the apparatus, and facilitate and simplify its use.

Sheets are examined and counted by first and second sensors, the handling apparatus normally feeding the sheets past the sensors one at a time at spaced intervals normally providing a gap between the trailing edge of each sheet and the leading edge of the next succeeding sheet. The difference in transmissivity of a gap and a sheet is utilized for counting purposes. Each sensor cooperates with both singles and doubles detection circuitry for detecting the presence of sheets, gaps between sheets, or holes within sheets, and further detecting the presence of double-fed sheets. Each sensor circuit is comprised of an LED and cooperating photodiode. Signals from the photodiodes are amplified by amplifying means including manually adjustable gain control means for adjusting the gain of the amplifier in accordance with the transmissivity of sheets being handled over a range from light (i.e. high transmissivity) to dark (i.e. low transmissivity). The amplified signals are further applied to a feedback circuit which regulates the current to the LED to provide optimum sensing conditions. The current regulated, amplified signal developed by each sensor is simultaneously applied to a pair of comparators for comparison against predetermined threshold levels to detect the presence of single-fed or double-fed sheets. The detection of the leading edge of a sheet causes each single sheet detection comparator to operate an electronic switch means to abruptly and significantly change the threshold level applied to both the singles and doubles detection comparators during the remainder of the detection cycle to prevent high density/and transmissivity portions of a sheet from generating a false count. The threshold circuit compensates for drift due to gradual changes in signal output resulting from aging of electronic components, accumulation of dust and the like.

Output signals from the single document detection comparators are utilized for counting purposes.

The sensor signals undergo a second stage of amplification before being applied to the double-fed document comparators, the last-mentioned amplifier being normally maintained in saturation. When the signal developed by the sensor drops significantly, the last-mentioned amplifier is driven out of saturation whereby only large negative transitions of the sensor signal drive the last-mentioned amplifier out of saturation thereby significantly enhancing the capability of the comparator circuit for detecting differences between clean, double-fed sheets and a dirty single-fed sheet, for example.

The signals developed by the first and second sensors are examined to assure the accurate counting of sheets, even in the event that they are fed in a skewed fashion. For example, if the leading edge of a sheet passes the sensors at different times, a sheet will be counted even if one sensor indicates the sheet as being present while the leading edge has yet to be detected by the remaining sensor. The signals and their time occurrence relative to one another are utilized to determine the presence of single and/or double-fed sheets as well as misaligned sheets.

Sensors are also provided within the infeed hopper and output stacker to provide signals utilized by the microprocessor to automatic operation of the equipment. The sensor circuits incorporate drift adjustment means to compensate for changes in sensor output level due to component aging, dust accumulation and the like.

The document handling and counting apparatus is activated by operating an off/on switch. When a stack of sheets is placed in the input hopper, the sheet feeding apparatus is automatically energized and the sheet counter is reset, without using the start button. Sheets are separated, counted and stacked in the output stacker. When the input hopper is empty, the sensor turns off the motor of the feeding apparatus. The count is automatically reset when the next counting operation begins, i.e., when sheets are placed in the input hopper. The procedure is similar when the apparatus is operated in a batching mode. When the batch amount is collected in the output stacker, operation is halted. If the completed batch is removed from the output stacker and there are bills in the input hopper, the apparatus automatically restarts. The sensor circuits utilize solid state comparator circuits which provide extremely large input impedances forming part of the adjustable threshold circuit which prevents discharge of the capacitance element employed therein, even after a lengthy time interval between the last time the presence of a sheet was sensed and the next time that the sheets are placed into the hopper, which period can be of the order of more than an hour, without affecting the accuracy and operating efficiency of the circuitry.

The microprocessor samples the outputs of the sensors at predetermined intervals. The sampled values are accumulated in single, double and hole counters associated with each sensor. These counters are examined and their counts are utilized to count sheets, indicate jam or error conditions, and indicate the presence of half-sheets and double-fed sheets as well as identifying other conditions.

The microprocessor also controls electronic circuitry for turning on and turning off the primary drive source for the apparatus and for operating at a changed speed. This capability is also utilized to complete a batch and prevent misfeeding of the next sheet.

The microprocessor is adapted to accommodate printing calculator means and interfaces with the printing calculator to synchronize operations including the transfer of data between the microprocessor and the printing calculator and to enable either apparatus to control and/or halt the operation of the other under command.

The microprocessor stores all of the data including time delay information and the like related to operating speed. The microprocessor is also capable of changing the operating speed of the apparatus and, responsive to such a change, the timing circuits are automatically readjusted to accommodate the speed change.

The equipment is adapted to accommodate different types of keyboards without requiring any additional programming.

OBJECTS OF THE INVENTION AND BRIEF DESCRIPTION OF THE FIGURES

It is, therefore, one object of the present invention to provide a novel microprocessor based control system for document handling and counting apparatus for automating handling and counting operations.

Still another object of the present invention is to provide novel control circuitry for document handling and counting apparatus having a greatly enhanced capability of distinguishing between single and double-fed sheets passing through said apparatus.

Still another object of the present invention is to provide a novel method and apparatus for counting sheets, even though fed in a skewed and/or overlapping fashion.

Still another object of the present invention is to provide novel sensing and control means for analyzing and counting sheets regardless of their orientation as they pass through said apparatus.

Still another object of the present invention is to provide novel microprocessor based control means for document handling and counting apparatus for controlling all of the operations of the document handling and counting apparatus, as well as simplifying and automating operation of the apparatus to provide capabilities not contemplated by state of the art apparatus.

Still another object of the present invention is to provide a self-compensating threshold circuit for document sensors to prevent erroneous operation due to long delays during which no documents are present in the stacking device.

The above, as well as other objects of the present invention, will become apparent when reading the accompanying description and drawing in which:

FIG. 1 is a simplified diagram showing a document handling and counting apparatus which may be controlled by the system of the present invention.

FIG. 1a is a simplified diagram showing the manner in which sheets are examined by the sensors provided in the apparatus of FIG. 1.

FIG. 2a is a schematic diagram of a sensing circuit which may be substituted for the sensor circuits shown in FIG. 2.

Figure 2:
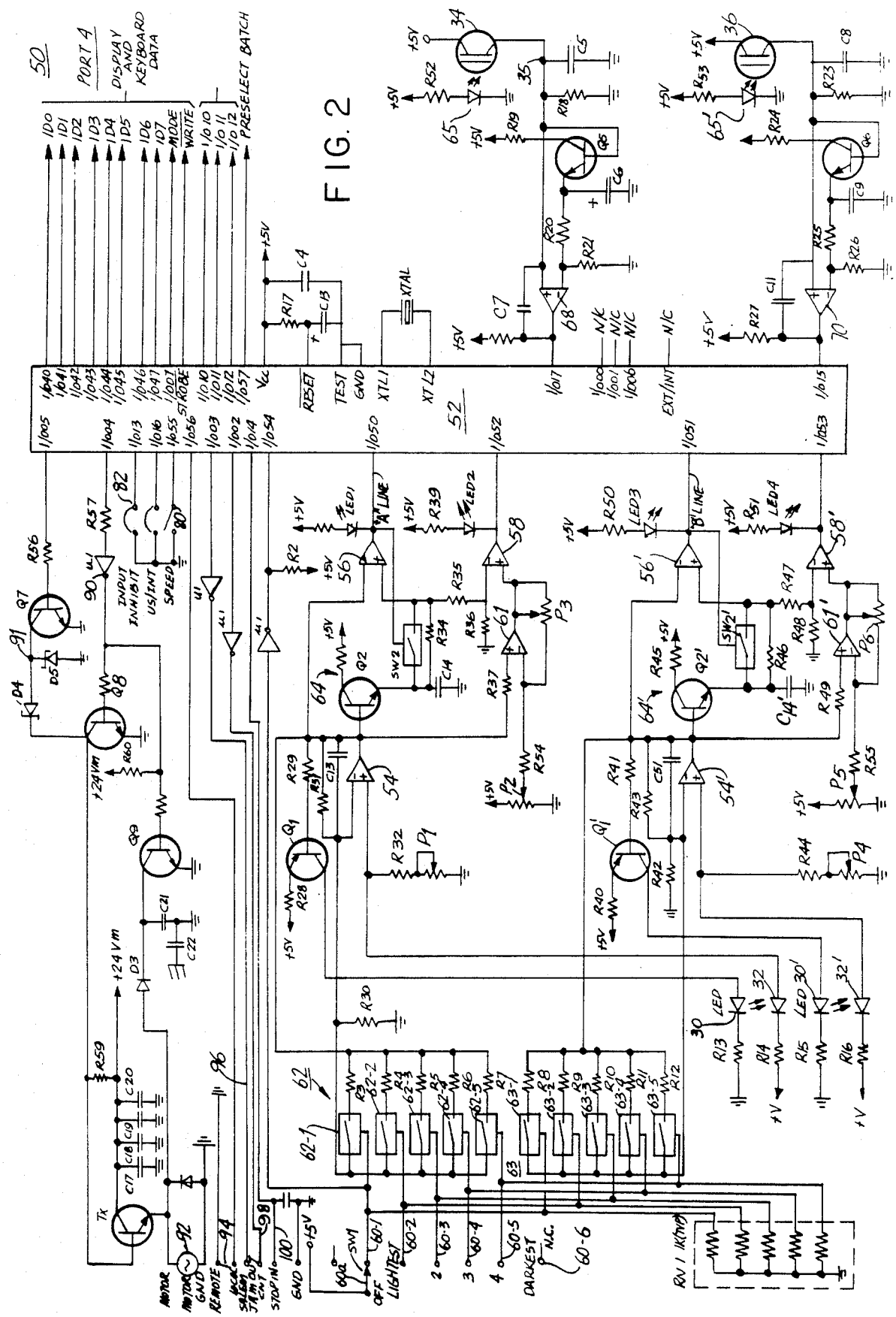
FIG. 2 shows a diagram of the electronic control system employed for controlling the apparatus of FIG. 1.
Figure 3:
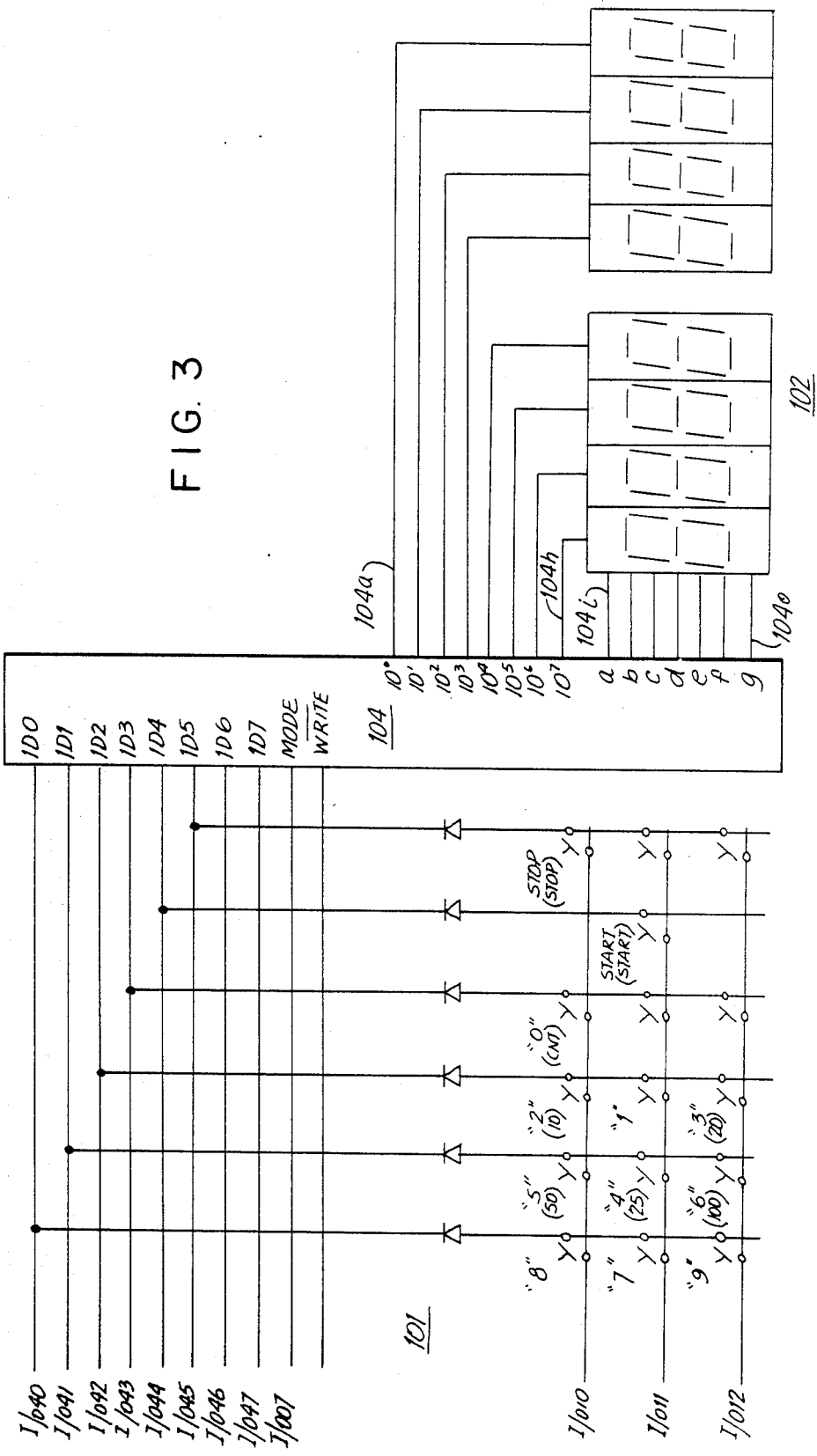
FIG. 3 is a schematic diagram of the keyboard and display means for used with the system of FIG. 2.

FIGS. 4, 5, 5a through 5d, 6a through 6d, 7a through 7e, 8a and 8b show flow diagrams indicating the manner in which the microprocessor employed in the system of FIGS. 2 and 3 controls the document handling and counting apparatus of FIG. 1 to achieve the unique capabilities of the present invention.

Figure 6E:
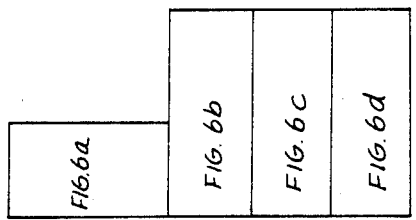

FIG. 6e shows the manner in which FIGS. 6a–6d are arranged.

Figure 7F:
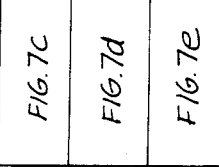

FIG. 7f shows the manner in which FIGS. 7a–7e are arranged.

DETAILED DESCRIPTION OF THE INVENTION

FIG. 1 shows a simplified view of the document handling and counting apparatus 10 with which the present invention is employed, a detailed showing and description of the apparatus 10 being contained in the aforementioned application Ser. No. 288,646. For purposes of understanding the present invention, it is sufficient to understand that the apparatus 10 receives a stack of sheets in input stacker (i.e. hopper) 12. The bottom sheet is advanced from input hopper 12 by picker wheel 14 and passes between a stationary stripper shoe 15 and a cooperating feed roller 16 rotatable about shaft 18. An idler roller (not shown) hidden behind feed roller 16 and rotatably mounted upon shaft 18, is rotated by acceleration roll 20. Single sheets fed between feed roller 16 and guide plate 22, due to the stripping action of stripper shoe 15, move into the nip formed by the idler roll and acceleration roll 20 and are rapidly accelerated toward an outfeed stacker 24 comprised of a fan assembly 26 and extendable stacker plate 28 for collection of sheets.

The acceleration of sheets by accelerator roll 20 and its cooperating idler, forms a gap between adjacent sheets. The detection of the change in transmissivity between a gap and a sheet by light source 30 and cooperating light sensitive element 32 is utilized for counting purposes.

A sensor 34 and light source 65 are utilized to sense the presence of sheets in the input stacker 12 while a sensor 36 and light source 65' are utilized to sense the presence of sheets in the output stacker plate 28.

FIGS. 2 and 3 show the electronic circuitry 50 employed for controlling the document handling and counting apparatus 10 of FIG. 1. The control circuitry 50 comprises a microprocessor 52 which may, for example, be a model 3870 manufactured by Fairchild, Mostek and Standard Microsystems Corporation. Microprocessor 52 may have either 2,000 or 4,000 bytes of storage of the read-only-memory type and a scratch pad memory comprised of 64 bytes of random access memory storage all arranged on a single chip.

The sheet sensing means is comprised of a pair of light sources 30 and 30' arranged in side-by-side fashion, as shown in FIGS. 1, 1a, and 2 and cooperating with photodiodes 32, 32', which independently detect the transmissivity conditions at their respective locations, which conditions typically comprise the absence of sheets, the presence of a single sheet, and the presence of multiple sheets. The use of a pair of light sources 30, 30' and cooperating photodiodes 32, 32' permit the accurate counting of sheets in spite of the fact that sheets may be fed through the document handling and counting apparatus 10 in a skewed and/or overlapped fashion, as will be described in greater detail hereinbelow.

Each light source, 30, 30', which is preferably an infrared light emitting diode (LED), has its current controlled through a feedback circuit, to be more fully described. The photodiodes 32, 32' have their outputs coupled to operational amplifiers 54, 54' each of which amplifies the output of its photodiode and simultaneously couples the transmissivity signal to feedback transistors Q1, Q1', comparators, 56, 56', comparators 58, 58=, through amplifiers 61 and 61' respectively, and the transistors Q2, Q2' forming part of the self-compensating threshold circuits, to be more fully described.

The strength of the signal developed by each of the photodiodes 32, 32' is amplified by the operational amplifiers 54, 54' respectively. The amplification of each amplifier 54, 54' is a function of the input impedance, for example, resistors R30 and R42, and the feedback impedance, for example, resistors R31 and R43, respectively. The magnitude of the gain is manually adjustable by controlling the setting of switch SW1 between an OFF position 60-1 and four different brightness conditions 60-2 through 60-5. Switch arm 60a selectively controls the operation of one of the solid state switches 62-1 through 62-5 and 63-1 through 63-5 in the switch banks 62 and 63, to selectively couple on of the resistors R3 through R7 in parallel with feedback resistor R31 and, to selectively couple one of the resistors R8 through R12 in parallel with feedback resistor R43.

For example, assuming that it is desired to process brown ($1.00) food stamps, the switch arm 60-a is set to engage contact 60-4, closing switches 62-4 and 63-4 to place resistors R5 and R10 in parallel with resistors R31 and R43 respectively, thereby adjusting the gain of operational amplifiers 54, 54'. The resistors R3 through R7 and R8 through R12 have different resistivities to adjustably control the gain of the signal developed by the operational amplifiers 54 and 54'. The amplified signal is applied to the base electrodes of transistors Q1 and Q1' respectively, to control the emitter current for these transistors and thereby control the brightness of LEDs 30 and 30'.

The signals developed by photodiodes 32, 32' are also applied to the singles detection comparators 56, 56' and the doubles detection comparators 58, 58' (through the amplifiers 61, 61' respectively). The outputs of the comparators 54, 54' are also applied to the self-adjusting threshold circuits 64, 64' as will be more fully described hereinbelow.

Each of the self-adjusting threshold circuits is comprised of a transistor Q2, Q2', and a capacitor C14, C14', coupled to each emitter electrode. Resistors R34–R36, R46–R48 respectively cooperate with capacitors C14, C14' to develop a reference level across capacitors C14, C14', a portion of which is applied to the non-inverting input of comparators 56, 56'. The solid state switches SW2, SW2' which are coupled across resistors R34, R46 are normally open. These solid state switches are closed when comparators 56, 56' recognize the presence of the leading edge of a sheet passing their respective photodiodes 32, 32' and change state to apply a signal to solid state switches SW2, SW2' which short circuit resistors R34, R46 increasing the reference level of the non-inverting inputs of comparators 56, 56' thereby preventing any significant changes in transmissivity of the sheet being detected from being erroneously interpreted as a leading edge signal. As soon as the trailing edge of a sheet passes each light sensing element 32, 32', the output levels of comparators 56, 56' change to re-open solid state switches SW2, SW2'.

The outputs of comparators 56, 56' are also coupled to associated inputs of microprocessor 52 and are employed for counting purposes as well as evaluating the transmissivity of the sheets being processed.

The light sensing elements 32, 32' are coupled through operational amplifiers 54, 54' to the high gain amplifiers 61, 61' whose outputs are coupled to the non-inverting inputs of comparators 58, 58'. The amplifiers 61, 61' are normally driven into saturation in the presence of a signal level in the range normally encountered when single sheets are passing the sensors. When multiple sheets pass the sensors, the signals developed by the sensors are considerably reduced, causing the operational amplifiers 61, 61' to move out of saturation. The amplified signals of amplifiers 61, 61' are applied to the non-inverting inputs of comparators 58, 58' where they are compared against the reference levels applied to the inverting input of comparators 58, 58', whose outputs are coupled to respective inputs of microprocessor 52 for processing. The outputs of comparators 58, 58' are utilized for detecting the presence of double or multiple fed sheets.

Potentiometers P1, P4, shown in FIG. 2, are utilized to compensate for differences in the operating characteristics of photodiodes 32, 32', coupled to the comparators 54, 54' respectively. Potentiometers P2, P3 are respectively provided to adjust the bias and gain of amplifier 61. Potentiometer P2 is adjusted to operate amplifier 61 at its upper saturation point. Potentiometers P5, P6 operate in a similar fashion to control the gain and operating level of amplifier 61'.

The sensors 34, 36, (see FIGS. 1 and 2) respectively located in the infeed hopper and outfeed stacker of the document handling and counting apparatus 10, cooperate with the LEDs 65, 65' to detect the presence of sheets to provide substantially automatic operation, as will be more fully described. Since both of these sensing circuits are substantially identical in design and operation, only one will be described herein for purposes of simplicity.

When no sheets are in the infeed stacker, capacitor C5 is charged by the current from phototransistor 34 and transistor Q5 is turned on, charging capacitor C6. The output at terminal 35 is now high. When sheets are inserted into the input tray 12, capacitor C5 discharges through R18 and the level at the non-inverting input of comparator 68, which is coupled to terminal 35, goes low, due to the significant reduction in light intensity of the light of LED 65, which is blocked from reaching phototransistor 34. At this time transistor Q5 is in cut-off and capacitor C6 normally discharges at a slower rate than capacitor C5, causing the output of comparator 68 to go low when the level at its non-inverting input drops below the level at it inverting input. This signal is applied to microprocessor 52, to indicate that sheets are present in the input tray. As soon as the input tray is empty, the level at terminal 35 goes high and, even though transistor Q5 conducts to charge capacitor C6, the voltage divider circuit comprised of resistors R20 and R21 applies a level to the inverting input which is lower than the level at terminal 35, causing the output of comparator 68 to go high.

If a large number of sheets are placed in the input tray, capacitor C6 discharges slowly over a longer period of time than the discharge of capacitor C5, whereby the stored voltage level across C6 may fall below the level at the non-inverting input of comparator 68, causing the output of comparator 68 to go high. Feedback capacitor C7 couples this high level to the base of Q5.

Feedback capacitor C7 thus resets transistor Q5 to recharge capacitor C6 when the output of comparator 68 goes high. Thus, there is a momentary pulse at the output of comparator 68 which terminates upon abrupt recharging of capactior C6, i.e. when the voltage at the inverting input of comparator 68 is greater than the level at its non-inverting input. These momentary pulses ("glitches") appear at the output of comparator 68. In order that these pulses be ignored as indicative of the absence of documents, the microprocessor 52 is programmed to look at the output of comparator 69 over a predetermined time interval to be assured that the high level persists for a sufficient time interval.

The circuit components Q5, C6, R20 and R21, also comprise a drift adjustment circuit which automatically adjust for aging of the sensing circuit electrical components as well as the gradual accumulation of dust and dirt upon the LED 65 and/or phototransistor 34.

In order to be assured that the aforementioned "glitches" are not accepted by the microprocessor 52 as an indication of the absence of sheets, the circuitry of FIG. 2a may be used in place of the circuit described above.

FIG. 2a shows a circuit arrangement which may be substituted for the sensor circuit arrangements of FIG. 2 and which is designed to prevent the generation of erroneous document presence signals ("glitches") described above.

As shown in FIG. 2a, the alternative circuit arrangement 150 is comprised of an LED 152 cooperating with a phototransistor 154 whose emitter is coupled in common with the parallel coupled resistor and capacitor R1, C1, the non-inverting input of operational amplifier 155 and the non-inverting input of comparator 156. The output of operational amplifier 155 is coupled to the input of solid state switch 158, having a control input 158a for controlling the opening and closing of the sold state switch, which is shown in simplified fashion as having a mechanical switch arm 158b. The output of switch 158 is coupled to capacitor C2 and the non-inverting input of operational amplifier 160 which may be a type TL072 produced by Texas Instruments. Operational amplifier 155 may also be of the same type. The output of operational amplifier 160 is coupled to the voltage divider circuit R20, R21, whose common terminal is coupled to the inverting input of comparator 156 and to ground through capacitor C3.

In operation, when no sheets are present, lines 161 and 163 are high. The high level at output 161 is applied to the control input 158a of switch 158 to maintain the switch closed. Operational amplifier 155 charges capacitor C2 substantially instantaneously through closed switch 158. The level across capacitor C2 is coupled through operational amplifier 160, which has an input impedance of the order of $10^6$ Mohms, to resistors R20, R21. A voltage across R21 is developed across capacitor C3.

When sheets are placed in the input tray, the level across R1-C1 goes low, causing the output of comparator 156 to go low, thereby opening switch 158. The discharge path for capacitor C2 is through the $10^6$ Mohm input impedance of operational amplifier 160. Thus, capacitors C2, C3 discharge at an extremely slow rate, requiring of the order of one hour before being discharged, substantially preventing any erroneous sheet presence signal from being developed. Resistors R20, R21 and capacitor C3 function as a drift adjustment circuit in the same manner as resistors R20, R21 and capacitor C6, shown in FIG. 2.

Microprocessor 52, shown in FIG. 2, is utilized to control a motor control circuit, comprised of transistors Q7, Q8 and Q9, as well as transistor $T_x$. The control signal derived from microprocessor 52 is selectively applied to the base of Q7 to control transistor Q7. When the control signal is low, transistor Q7 is driven into cut-off placing a level at the base of $T_x$ which is the sum of the values across zener diodes D4 and D5 to operate motor 92 at normal speed. When the control signal is high, transistor Q7 conducts, grounding terminal 91, reducing the level at the base of $T_x$ to the value across zener diode $D_4$, to operate motor 92 at one-third normal speed.

Transistor Q8 receives a control signal from the microprocessor 52 through inverter 90 to shunt the base of $T_x$ to ground, for controlling the current applied to motor 92. The signal applied to the base of transistor Q8 is also coupled to the base of transistor Q9, which is connected across motor 92 and serves to provide dynamic braking for motor 92. Diode D3 limits the magnitude of the current spike developed when regulator $T_x$ and Q9 are both on momentarily. Motor 92, under control of microprocessor 52, is thus capable of being operated at normal speed, one-third normal speed or being deenergized and abruptly halted. Inverter 90 isolates the +24 VDC supplying the bases of Q8 and Q9 from terminal I/O 04.

As will be explained hereinbelow, microprocessor 52 automatically selects those values stored in its memory which relate to the operation of the apparatus 10 at normal speed. In the event that the apparatus 10 is operated at one-third normal speed, microprocessor 52, in addition to reducing the current to motor 92, selects those values stored in its memory which are related to operation of apparatus 10 at one-third normal speed.

The speed switch 80 is utilized to select the operating speed of motor 92. Jumper 82 is utilized to inhibit the signal from the input tray of the apparatus 10 to disable the automatic start capability of the apparatus, as will be more fully described.

The electronics shown in FIG. 2 may be utilized in combination with an accounting device (not shown) marketed by the assignee of this invention under the name SALEM and which is capable of developing the monetary totals of currency counted by apparatus 10. Switch 94 is operable to select remote or local operation, such that when switch 94 is open, microprocessor 52 operates independently and when switch 94 is closed, microprocessor 52 operates as a "slave" to the accounting system. Line 98 applies count pulses of the currency being counted from microprocessor 52 to the remote accounting apparatus for use in the accounting operation. Line 96 is coupled to the according apparatus (hereinafter "SALEM") for advising SALEM that a jam has occurred. Line 100 couples SALEM to an associated input of microprocessor 52 to halt operation of the feed mechanism, controlled by microprocessor 52, pending the completion of an accounting operation which is still in process.

Microprocessor 52 scans the input keyboard 101 shown in FIG. 3 through the input/output lines I/O 40 through I/O 45 and is coupled to a digital display 102 through the input/output lines I/O 40 through I/O 47, the mode line I/O 07 and the STROBE line ($\overline{\text{WRITE}}$). The aforementioned lines are coupled to solid state circuit 104 which stores the incoming seven-segment character signals sequentially applied at outputs 104a through 104h and repetitively couples the segment selection signals appearing at outputs 104i through 104o to the proper digit position.

Solid state circuit 104 is a type 7218 manufactured by INTERSIL, and capable of receiving each byte of a character to be displayed in a segment code format storing eight such bytes and thereafter scanning and refreshing the display units of display 102, when the eight bytes have been transferred thereto.

The keyboard 100 is of a matrix type and is provided with a plurality of push-button type keys. The key set may be a "0" through "9" key set including function keys, namely a start key and a stop key. Alternatively, the keys (as shown in FIG. 3 in brackets) may be fixed amount batch keys for forming batches of 10, 20, 25, 50 and 100 sheets plus function keys including start, stop and count keys. The software is selected according to the key set being used. Input/output lines I/O 10 hrough I/O 12 are coupled to the horizontal matrix lines of the keyboard 101 and are examined by microprocessor 52 as each line I/O 40-I/O 45 is scanned. Dependent upon the numeric key or function key which has been closed, the signals will be coupled to one of the input/output lines I/O 10 through I/O 12. This provides a multiplexed utilization of the input/out lines, reducing the number of lines requires for connection between keyboard 100 and microprocessor 52. The line of group I/O 40-I/O 45 is enabled and the line I/O 10-I/O 12 which returns the enabled condition, determine the code selected from a look-up table in the microprocessor 52, which look-up table is part of the ROM. Each register stores an eight bit byte. Seven of the eight bits represent an associated one of the segments of the seven-segment display. The eighth bit represents the decimal point. Each register is associated with one of the output lines I/O 40-I/O 45 and one of the return lines I/O 10-1/012. The byte selected from the look-up table is transferred to the display buffer (a register in microprocessor 52) for transfer to circuit 104 as will be more fully described.

Display 102 is operated in a multiplex fashion, wherein a byte representing the selected character segments is transferred to solid state circuit 104. When eight bytes have been transferred to circuit 104, circuit 104 is placed in the display mode whereby the characters are sequentially generated and the sequence is repeated a sufficient number of times at a sufficient repetition rate to cause the display 102 to appear, to the human eye, to provide a "steady" illumination.

Figure 2B:
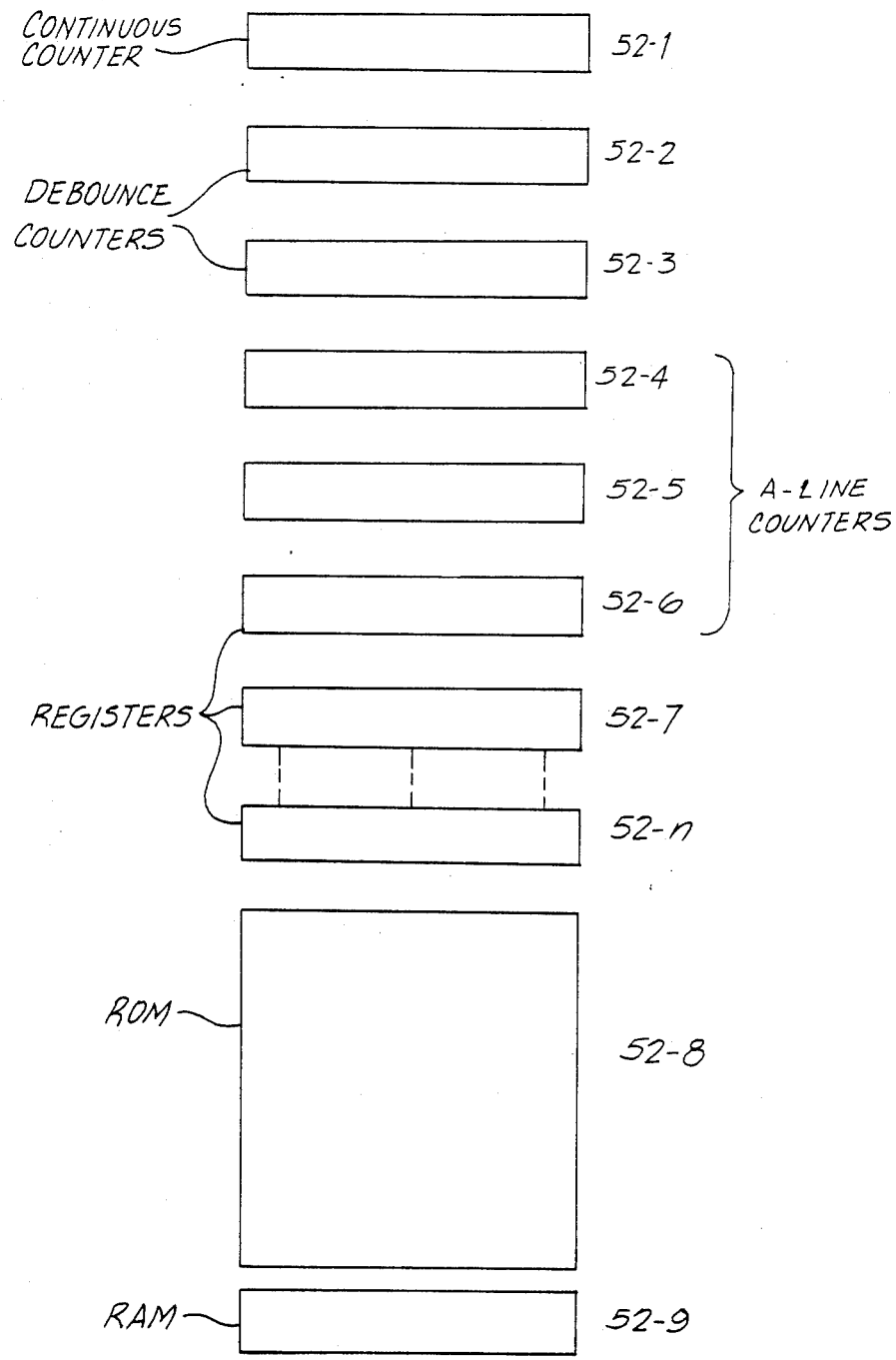
FIG. 2b is a simplified block diagram showing some of the circuitry forming an integral part of the microprocessor shown in FIG. 2.

FIG. 2b shows a simplified view of some of the contents of microprocessor 52 which, among other components, includes continuous counter 52-1, debounce counters 52-2 and 52-3, counters 52-4, 52-5 and 52-6 for storing counts representative of the presence of a single sheet (A counter) a hole within a sheet (A hole counter) and double feed sheet (A double counter). These counters are associated with the "A" line (see FIG. 2) which is coupled to light sensor 32. A similar set of three counters is also associated with the "B" line (FIG. 2), which is coupled to the light sensor 32'. The counters for the B line have been omitted merely the purposes of simplicity. It should be understood that these counters are substantially identical in design and function to counters 52-4 through 52-6.

The microprocessor 52 further includes at least one register 52-7 for storing flag and status bits, such as half-note, jam, local, remote, run, stop and continue conditions, as well as other conditions which will be more fully described hereinbelow. Similar registers serve as the keyboard buffer, and registers for storing addresses, as well as an accumulator. The 2000 byte read only memory (ROM) 52-8 stores the program routines to be described.

Microprocessor 52 further incorporates a 64 byte memory, such as for example, a random access memory (RAM). Some of these memory locations have been shown in simplified fashion as box 52-9 in FIG. 2a for storing data words and the like which are employed for control and/or display purposes for storing the table look-up information, and so forth. Each ROM address of the table look-up stores a byte representing the segments of an associated one of the numbers or alphabetic characters capable of being displayed by the display 102. What is going out of port 4 (i.e. out of the I/O lines 40 through 47) and what is coming into port 10 (i.e. one of the I/O lines 10 through 12) identifies a specific location in ROM.

Figure 3L:
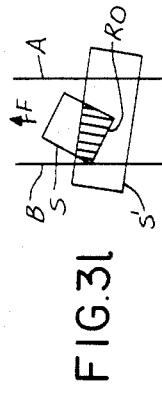
FIGS. 3a through 3r show sheet feeding conditions which are useful in describing the operation and capabilities of the system of the present invention.
Figure 3M:
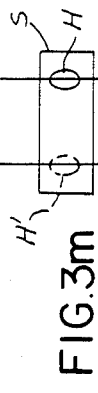
Figure 3N:
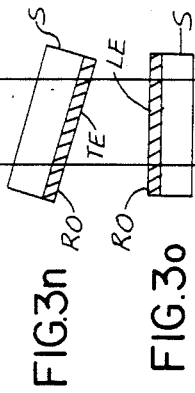
Figure 3O:
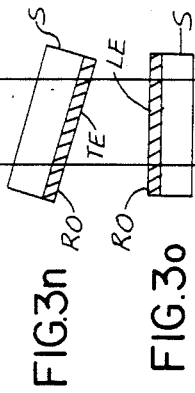
Figure 3P:
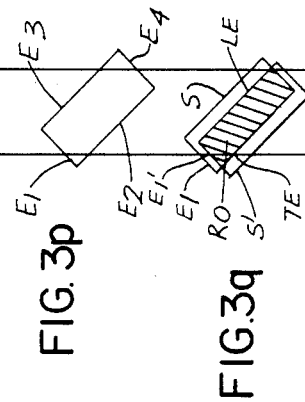
Figure 3Q:
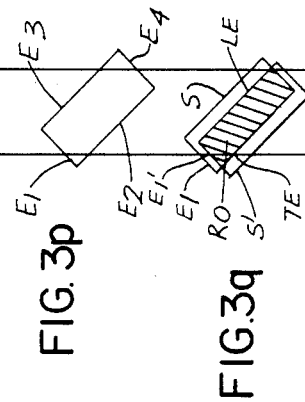
Figure 3R:
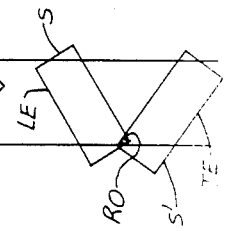
Figure 3F:
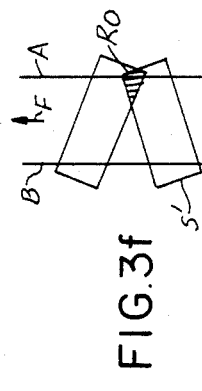
Figure 3G:
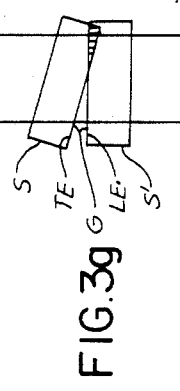
Figure 3H:
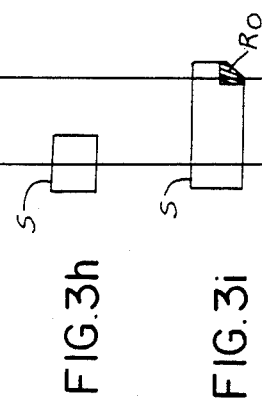
Figure 3I:
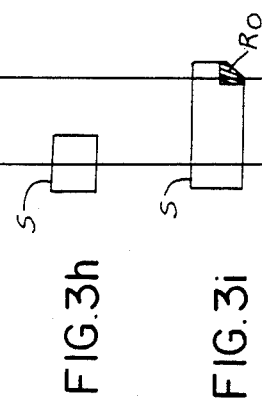
Figure 3J:
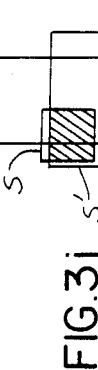
Figure 3K:
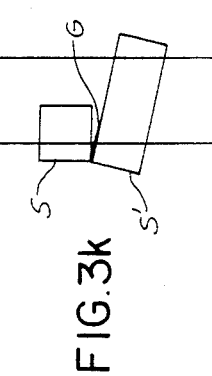
Figure 3A:
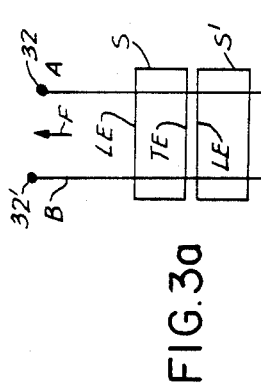

FIGS. 3a through 3s shown a variety of different conditions which may occur in the feeding and handling of sheets, (i.e. notes or paper currency), which conditions are capable of being recognized by the system of the present invention. As was described hereinabove, the sensors 32, 32' are capable of sensing basically three different intensity ranges, namely a high intensity range during which no sheets are present between each LED (30, 30') and its cooperating light sensing element (32, 32') or during which time a hole or opening in a sheet is arranged between each LED and its light sensing element. The medium light intensity range is present when the light intensity is reduced due to the passage of a single sheet between the LEDs 32, 32' and light sources 30, 30'. It should be understood that the actual transmissivity is a function of the condition of the bill (i.e., clean or dirty) and is also a function of the ink density of the portion of the bill passing between the LEDs and light sources and hence constitutes a range of intermediate light intensity. The third low, light intensity range is that which occurs when two (or more) sheets are passing between the LEDs and light sources wherein, assuming, for example, that all of the bills are in the same condition and have the same transmissivity, the light intensity picked up by the light sensitive elements 32, 32' during the presence of two sheets will be approximately one-half the intensity sensed by sensors 32, 32'' when a single sheet is passing between the LEDs and the light sources.

Under normal conditions, detection of an abrupt change in light intensity from the upper range to the intermediate or lower range is indicative of the fact that a leading edge is passing between the LEDs and light sources. At this time, the A and B counters are set to a maximum count, as will be more fully described. In one preferred embodiment, this count is a count of 90. The sensor elements are examined every millisecond (when operating at normal speed) to examine their state. A change in light intensity from the high range to the mid range detects the leading edge of a sheet. When the mid range condition is present, the counter for that particular sensor is decremented by one count each millisecond, i.e., from 90 to 89, from 89 to 88, and so forth.

In accordance with the criteria established in one preferred embodiment, the presence of a medium range intensity signal during three consecutive samplings of a sensor is detected as the presence of a sheet, despite the fact that the sensor level of each signal continues to be examined during the presence of a note beyond the count of 87.

The feed rate of notes in the preferred embodiment is such that the A and B counters will be decremented by 25 counts, since it takes about 25 milliseconds for a bill to pass the sensor, given that the standard width of a bill (measured in the feed direction) is 66 millimeters, the paper note is being fed at the rate of 26.4 meters per second, or better than 1000 inches per second.

As further criteria in the preferred embodiment, if the A or B line counters are decremented to a zero count, i.e. if the single sheet condition is present during ninety consecutive samplings, which is more than 3.6 times the time normally required for a single bill to pass the light sensors, this criteria gives each single bill more than sufficient time within which to move through the sensing location. Hence, a count of zero (i.e. an accumulated count of 90) is interpreted as a jam condition.

The hole counters are each capable of accumulating at least a count of 5 and are operated as up/down counters which are incremented during the presence of a hole or gap and which are decremented during the presence of either a single fed sheet or double fed sheet condition, with the only other proviso being that no decrementing takes place if the counter has already been decremented to a zero count. In the preferred embodiment, when the hole counter reaches a count of 5, it is interpreted as a gap between adjacent sheets.

The doubles counters for each sensor 32, 32' are operated in a manner similar to the single note counters, in that they are initially set to a maximum count and, whenever a low range light intensity is detected, indicating the presence of a double feed condition, the double counter associated with that sensor is decremented unless it has already reached a zero count. When a hole condition is present, the double counter is reset to maximum. In the preferred embodiment described herein, it is assumed that a double fed condition is present if the double counter accumulates at least five counts. Thus, when set to a maximum count of 5, a double feed condition is present when the double counter has been decremented to zero.

Considering the variety of possible conditions, which may occur during document handling and counting and as are shown in FIGS. 3a through 3r, the manner in which these conditions are identified as follows:

FIG. 3a shows an arrangement wherein sheets S, S' are moving in the feed direction, as represented by arrow F. Imaginary lines A and B represent the lines along which the sensor elements 32, 32' lie. In the example shown in FIG. 3a, this represents the normal counting condition. When the leading edge LE passes the sensors in the A and B lines, their A and B line counters begin decrementing. When they are decremented to a count of 87, a count pulse is generated. The counters continue to be decremented. Under normal feed conditions, the trailing edge TE of sheet S will pass beyond the sensors before the A and B line counters are decremented to zero. A sufficient number of hole conditions (5) will occur between the trailing edge TE of sheet S and the leading edge LE of sheet S' to have this condition interpreted as a gap between two adjacent sheets. When the A and B hole counters are decremented to zero, the A and B counters are reset to the maximum count. When the leading edge of sheet S' covers the A and B line sensors, the A and B line counters are decremented once every millisecond.

Figure 3B:
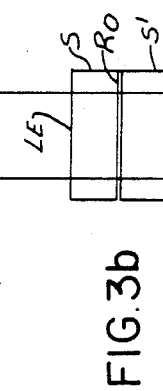

FIG. 3b shows an arrangement in which sheet S, S' are fed in a slightly overlapped fashion, so that the overlapped (shaded) region $R_O$ will cause the accumulation of several counts in the double counter for each of the A and B lines. The apparatus 10 will generate a "long" count when the sensors 32, 32' are covered for a period necessary to move almost four (4) overlapped bills past sensors 32, 32'.

Figure 3C:
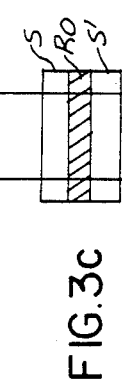

Considering FIG. 3c the overlapping of sheets S and S' (the region Ro), which can be seen to be significantly greater than the overlap in FIG. 3b, will cause the accumulation of at least five counts in both the A and B line double counters, which causes a setting of a double error bit, which is followed by a jump to the NOTE HALT routine, as will be described hereinbelow in connection with FIG. 8a. The NOTE HALT routine identifies the nature of the error and thereafter returns to the main program.

Figure 3D:
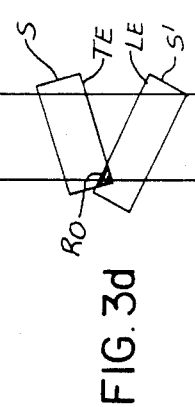

Considering the example of FIG. 3d, wherein sheets S, S' are fed in a skewed fashion, it can be seen that the sheets partially overlap in the region of the B line sensor, as represented by the shaded area $R_O$. The gap between the trailing edge TE of sheet S and the leading edge LE of sheet S' is detected by the A line sensor and is of a length sufficient to be interpreted as a gap between sheets. The A line counter is reset to maximum as soon as the hole counter is decremented to zero and thereafter begins decrementing as soon as the leading edge LE of sheet S' covers the A line sensor.

The criteria established in the preferred embodiment described herein is such that a double condition is not considered to be present unlss both the A line and B line double counters accumulate a count of at least five or more. Thus, sheets S, S' will each be counted as one sheet, despite the fact that the overlapping region $R_O$ causes the B line double counter to accumulate eight pulses.

Figure 3E:
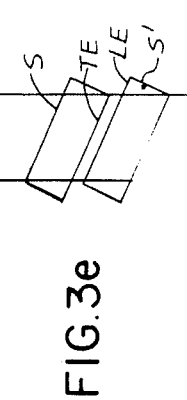

FIG. 3e shows a possible feed condition wherein sheets S, S' are fed in a skewed fashion and wherein the gap between the trailing edge TE of sheet S and the leading edge LE of sheet S' is sufficient in the region of the imaginary lines to cause both the A line and B line hole counters to accumulate a count of 5, Thus, both sheets S, S' will be counted, despite the fact that they are skewed when fed through the sensor location. The B line counter will stop counting before the A line counter, due to the skewed alignment of sheet S. The B line hole counter will begin to count holes before the A line hole counter. In addition, the sheet will be counted as soon as the B line counter is reduced to a count of 87. When this happens, the A line counter is reduced to a count of 86 to prevent the A line counter from generating an erroneous count which would cause sheet S to be counted as two sheets.

When the A line hole counter reaches a count of 5, this is interpreted as a gap between sheets S and S' and the A line counter is immediately reset to maximum count. The A line counter and hole counter operate in a similar but delayed fashion relative to the B line counter due to the skewed alignment of sheets S, S'.

The possible feed condition shown in FIG. 3f is substantially identical to that shown in FIG. 3d, except that the overlapped (shaded) region $R_O$ passes beneath the A line sensor, while the gap region between sheets S, S' passes beneath the B line sensor. The result of evaluation of the condition shown in FIG. 3f will be the proper counting of sheets S and S'.

In the embodiment shown in FIG. 3g, the A line double counter accumulates double counts representative of the overlapped (shaped region) $R_O$, whereas the B line hole counter accumulates less than 4 counts due to the small gap spacing G between the trailing edge TE of sheet S and the leading edge LE of sheet S'. Thus, the count in the B line hole counter will be interpreted as a "hole" in a sheet, as opposed to a gap between sheets and the passage of sheets S, S' will be interpreted as the passage of one sheet since the passage of the two overlapped sheets is insufficient to generate a "long" count in the A and B line counters.

In the feed condition shown in FIG. 3h, the passage of a single sheet S, beneath only one of the sensors, develops a half note error condition. This is accomplished by setting a half-note bit when neither the A and B lines are covered and resetting the half-note bit only if both lines are covered. When at least one of the A and B line hole counters have decremented to zero (5 counts after the leading edge of half sheet S), the half-note bit is examined. Since it is still set, this condition is interpreted as a half-note error. When the A and B line sensors are covered, the half-note bit is reset to prevent the interpretation of the presence of a half-note when both A and B lines are covered and their counters have started decrementing.

In the feed condition shown in FIG. 3i, sheet S is counted as one sheet, despite the fact that the doubles (shaded) region $R_O$ passes beneath the A line sensor and causes double pulses to be accumulated in the A line double counter. The sheet S is interpreted as one sheet and not as a double feed since the criteria of the preferred embodiment requires that both the A and B line double counters reach the zero count.

In the feed condition shown in FIG. 3j, wherein the half note S overlaps the left-hand portion of note S', this condition is interpreted as the passage of a single note, since, as was set forth hereinabove, a doubles error is present only when both the A and B line double counters accumulate at least five counts.

In the feed condition shown in FIG. 3k, due to the small gap G in the region between half note S and normal note S', the B line hole counter is prevented from accumulating at least five counts. Thus, the count will be interpreted as a "hole" within a document and the resultant count in the B line single sheet counter will indicate the presence of one document.

Considering the feed condition of FIG. 3l, although the half note S overlaps the following normal size note S' by an amount sufficient to accumulate five counts in the doubles counter, none of the overlapping (shaded) region $R_O$ passes beneath the A line sensor, and only a small portion of the overlapping region passes the B line sensor. Therefore, the condition shown in FIG. 3l will result in the count of one note.

The feed condition in FIG. 3m causes the A line hole counter to develop a count of 5 if the hole H is long enough to cause sheet S to be counted as two sheets. If the hole H is small enough to cause the A line hole counter to develop a count of less than 5, the sheet would be counted as only one sheet. The operation is the same if there are holes (H and H') passing both sensors. Holes not lined up with the sensor lines A and B are not detectable.

The examples given in FIGS. 3n and 3o, indicate that a portion of the sheet in each figure is folded over, or has a piece of opaque material or tape affixed thereto. If the shaded region $R_O$, at the trailing edge TE in FIG. 3n, or at the leading edge LE of FIG. 3o, causes the accumulation of at least five pulses in both the A line and B line double counters, the condition shown in FIGS. 3n and 3o indicates the presence of a double feed error.

In the example of FIG. 3n, in accordance with the criteria of the preferred embodiment, the double counters cannot be reset until both the A and B line sensors are uncovered. Thus, the double count of the B line double counter is retained until the A line double count reaches the doubles count or until the A line sensor is uncovered (i.e. senses a gap). Thus, only if both the B and A line doubles counters reach a count of 5, the sheet S will be interpreted as a double.

In the example of FIG. 3o, the doubles condition will also be detected as soon as the A line sensor provides 5 pulses to the A line double counter (the A line double counter reaches the count of 5 later than the B line double counter, since the sheet S is slightly skewed).

In the feed condition shown in FIG. 3p, edge E2 passes beyond the B line sensor before edge E3 moves beneath the A line sensor, resulting in the detection of a half note error. This condition will only be avoided if edge E3 passes beneath the A line sensor before edge E2 passes beyond the B line sensor. Thus, extremely skewed notes will be interpreted as a half note error condition in the example shown in FIG. 3p.

In the example of FIG. 3q, edge $E_1$ of sheet S passes the B line sensor. However, edge $E_1'$ of sheet S' passes the B line sensor before a note count is accumulated. The B line double counter begins to accumulate double counts. Even though the B line double counter reaches a double count, the A line double count does not.

When the trailing edge TE of sheet S passes the B line sensor, the B line double counter is decremented. By the time the leading edge LE of sheet S' begins to pass the A line sensor, the B line double counter may be below the count of 5 (depending on the length of the shaded region passing the B line sensor). The A line sensor does not see the double condition. Thus, this condition will not be interpreted as a double condition but will be counted as one sheet. However, if the A line double counter were to reach a count of 5 when the B line double counter contains a count of 5, this will yield a double error condition.

In the example given in FIG. 3r, this condition will provide a count of two sheets, since the A line sensor, when uncovered, resets the A line counter when the A line hole counter reaches a count of five (5).

Figure 5:
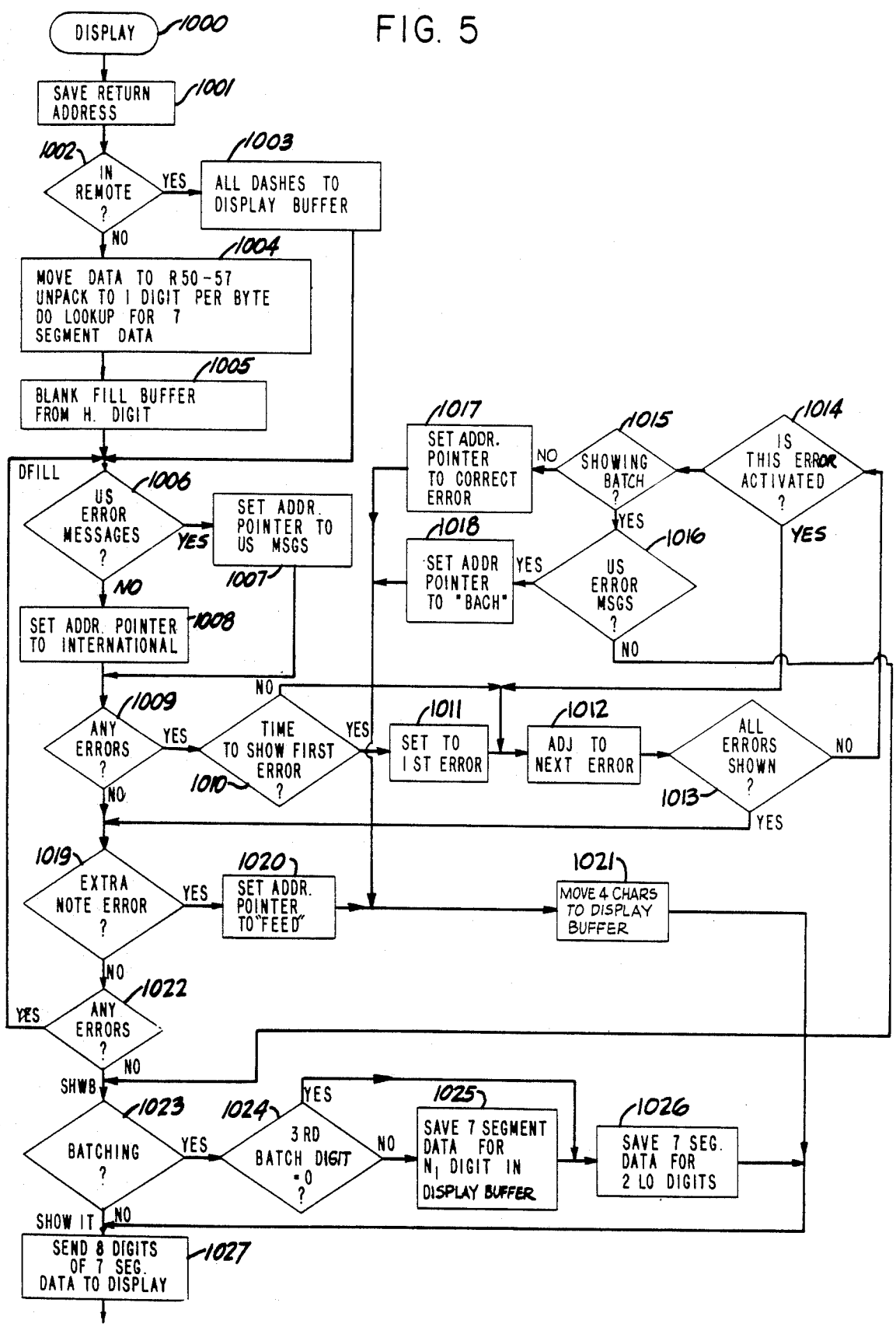

Turning now to a consideration of the control of apparatus 10 by microprocessor 52 and considering FIGS. 6a through 6d, the turn on of the apparatus 10 initiates the start of the program at 600, in which, at program step 602, the microprocessor 52 ports, remote/local, timer, key stack, and automatic start/stop conditions are all initialized. Registers R20 through R76 of the scratch pad memory are cleared and a delay is imposed for a length of time sufficient to allow the power supplies to stabilize before normal operation begins. The local/remote and SALEM stop/run conditions are examined at 604. If the remote and SALEM run conditions are present, the run condition of the SALEM (i.e., the remote accounting device) is examined at 605. If no run condition is detected, or an error is present (606) or the auto-start is inhibited (608), the STOP routine is called at 609. The STOP routine is shown in FIG. 5b and sets the stop bit, allows a delay before stopping the motor and then returns to program step 612. In the event that either the local mode or SALEM run and remote conditions are present, microprocessor 52 examines for the presence of error conditions (stored in a memory register) at 606, for the presence of an auto start inhibit condition (jumper 82 in FIG. 2) at 607, and examines to determine if documents are present in the input and not in the output. If no documents are present in the input, the program branches at 608a to step 612. If documents are present in the input and not the output, the START routine is called at program step 611. The START routine is shown in FIG. 5c and starts up the apparatus 10 as will be more fully described. The program then returns to the routine shown in FIG. 6a to step 612 to clear the key buffer which stores the previously inputted key code; to clear the batch value, to call the DISPLAY routine and to initialize the note counters. The DISPLAY routine which is shown in FIG. 5 and will be described below, clears and updates the display 102 and returns to step 614. At program step 614, the local/remote status is again examined. If a new local/remote status is detected at 614, this status is saved (in memory) at 616 and the program branches back through RESTART 618 to program step 604 through RESTART 619.

If the remote/local status is not changed, the KEY SCAN routine is called at 620.

Figure 4:
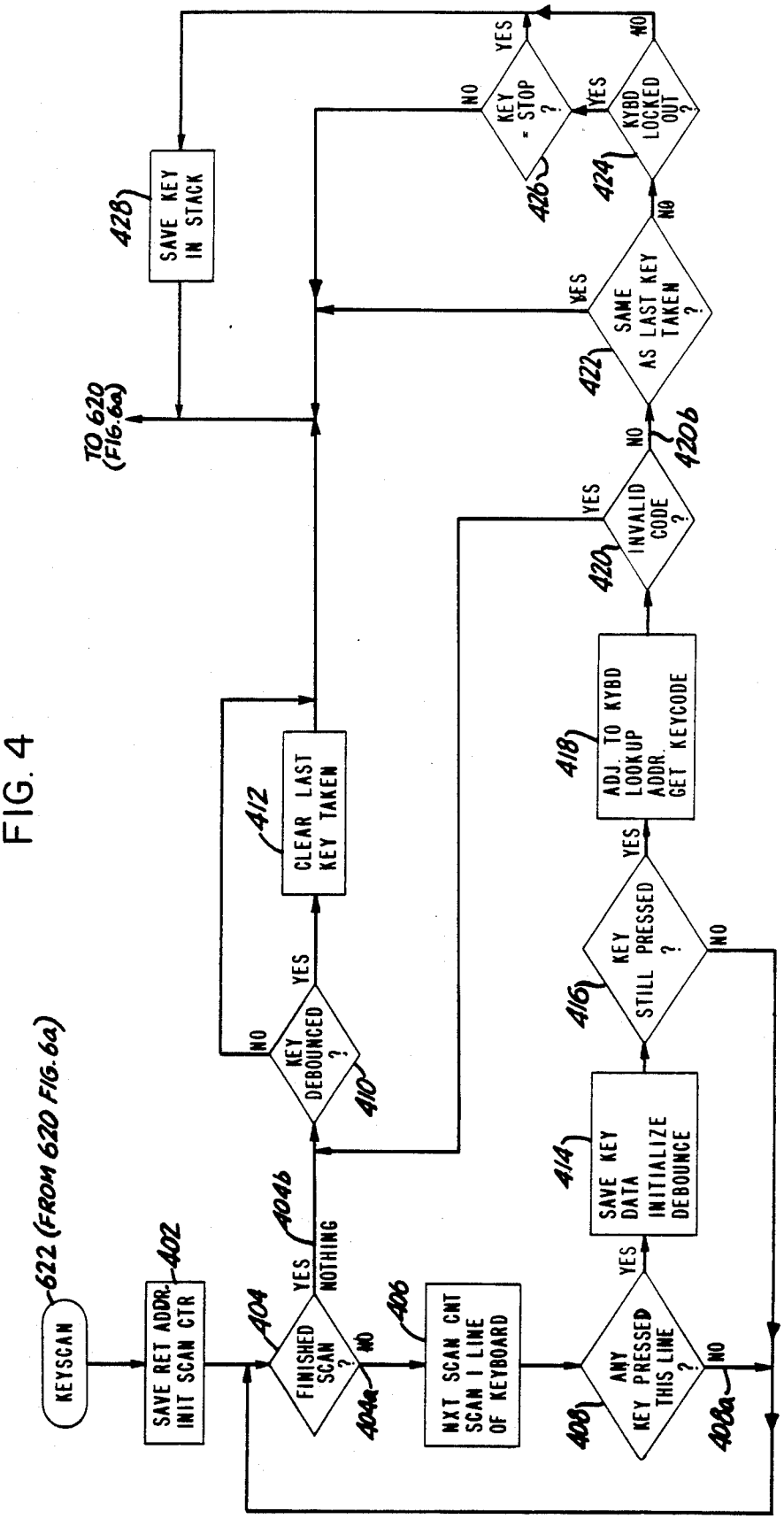
Figure 6A:
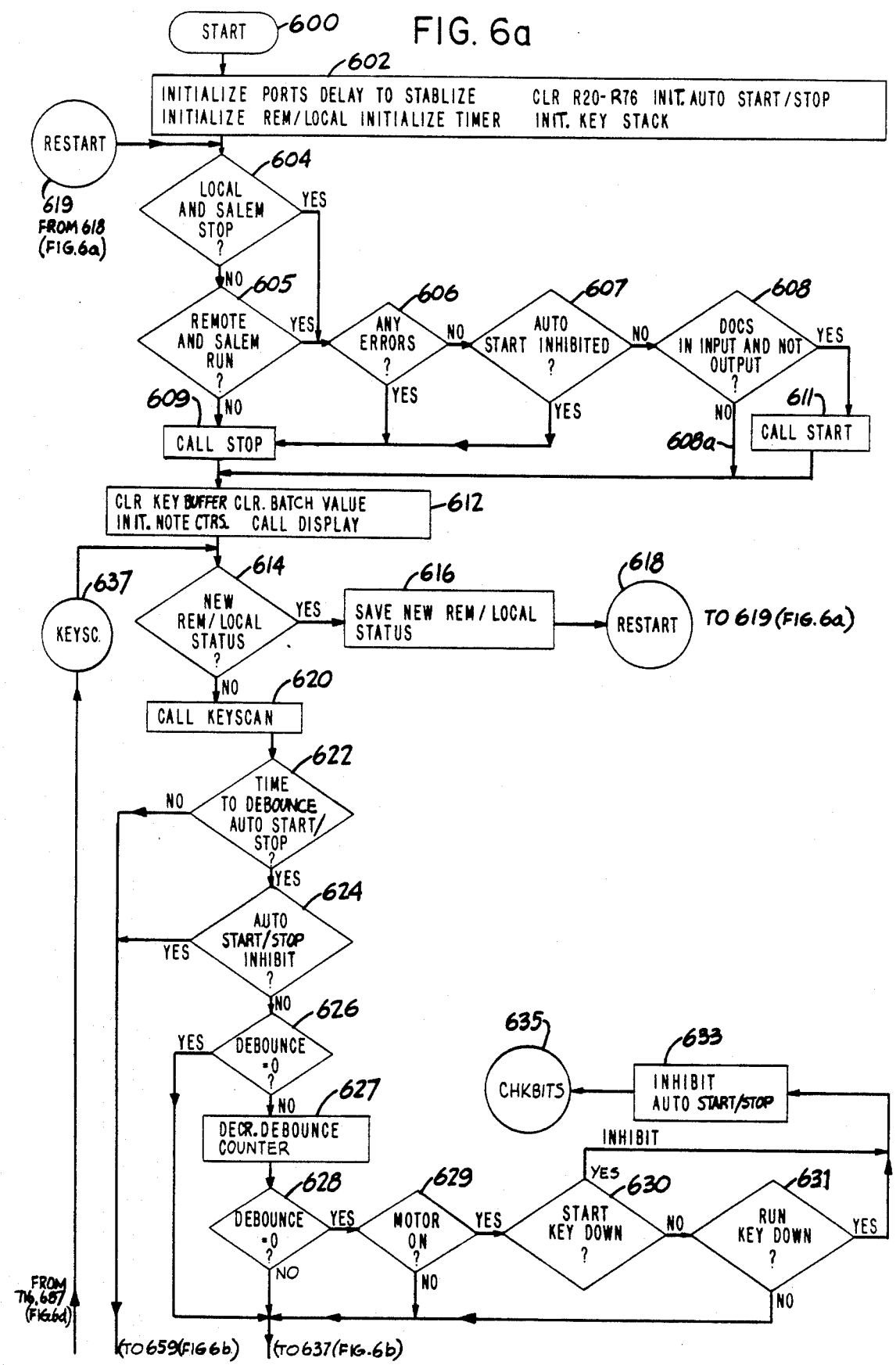

The KEY SCAN routine is shown in FIG. 4. At program step 402 the return address of the program is retained in a register in microprocessor 52 and the keyboard scan counter is initialized. If the scan has not been completed (step 404) the scan count is increased. In the event that the scan is completed, the key debounce counter of microprocessor 52 is examined. If the debounce counter has not counted out the program returns to step 622 (FIG. 6a). If the debounce counter has counted out (410), the register in memory storing the last key condition is cleared and replaced by an invalid code (412). The program then returns to step 622 (FIG. 6a).

Returning to step 404, if the scan count has not been completed, the scan count is incremented at 406 and the next line to the keyboard associated therewith is scanned. At 408 the return lines are examined for any depressed keys. In the event that no keys are depressed, the program recycles to step 404 until the scan is complete.

If any key is depressed, the key data is stored at step 414 and the debouncing routine is initialized. During the debouncing routine, a counter is set and is decremented. When the counter reaches zero the debounce interval is completed. In the event that the key is no longer depressed, which condition is examined at step 416, the program recycles back to step 404. In the event that the key is still depressed, the program advances to step 418 to determine the key code based upon the out and return line representing the key closure. This is accomplished in a look-up table. The code is examined at step 420. If the code is invalid, then the debounce counter is decremented at step 410. If not debounced, the program returns to step 622 in FIG. 6a. If debounced, the key code stored is cleared at 412 and replaced with an invalid code and the program jumps back to step 622, shown in FIG. 6a. In the event that the code is not invalid, the program branches at 420b to step 422 to determine if the code is the same as the last key taken (and stored at 414). In the event that the answer is yes, the program resumes at step 622; in the event that the key is different from the last key taken, the program, at step 424, examines to see if the keyboard is still locked out. The lock-out condition prevents keys accidentally operated from being acted upon during a normal counting operation. The only key which will be honored during a counting operation is the STOP key (FIG. 3). In the event that the keyboard is not locked out, the key condition is saved in the key stack (428). In the event that the keyboard is still locked out, if the STOP key has been pressed, this condition is saved in the key stack at 428 and operation resumes at program step 622. In the event that the STOP key has not been depressed, the program returns to step 622.

At step 622 (FIG. 6a), if the key entry indicates the apparatus 10 should be turned on, the automatic start/stop counter is reset. If no key has been taken to start the machine, the program jumps to step 659, shown in FIG. 6b, to examine the condition responsible for preventing the running of the apparatus 10, as will be described hereinbelow. If the automatic stop/start operating interval is initiated, the program advances to step 624 to examine the jumper 82 connection to determine if the automatic start inhibit condition has been selected or disabled. If the automatic start/stop operation has not been inhibited, the program advances to step 626. If the jumper 82 has been coupled (see FIG. 2), the program advances to step 659.

At program step 626 the debounce counter is examined. If the debounce count has not reached zero, the debounce counter is decremented at step 627. The debounce counter is again examined at program step 628. If the debounce count is not zero, the input hopper sensor 34 is examined at step 637 (FIG. 6b) to determine if a change has occurred. If the debounce count has reached zero, the program advances to program step 629 to determine the state of the motor 92. If the motor is not on, the program advances to step 637 to determine if there has been an input hopper sensor change. If the motor is on, the keyboard is examined at step 630 to determine if the start key has been depressed. If neither the start key, nor the run key have been depressed for two seconds, (examined at step 631), the program advances to step 637. If either the start or run key has been operated after two seconds, the automatic stop is inhibited at step 633 and the program jumps to step 659 (FIG. 6b) from step 635. This permits the machine to be examined with the motor running. This condition is terminated by depressing the stop key or by running a sheet through the machine.

Figure 6B:
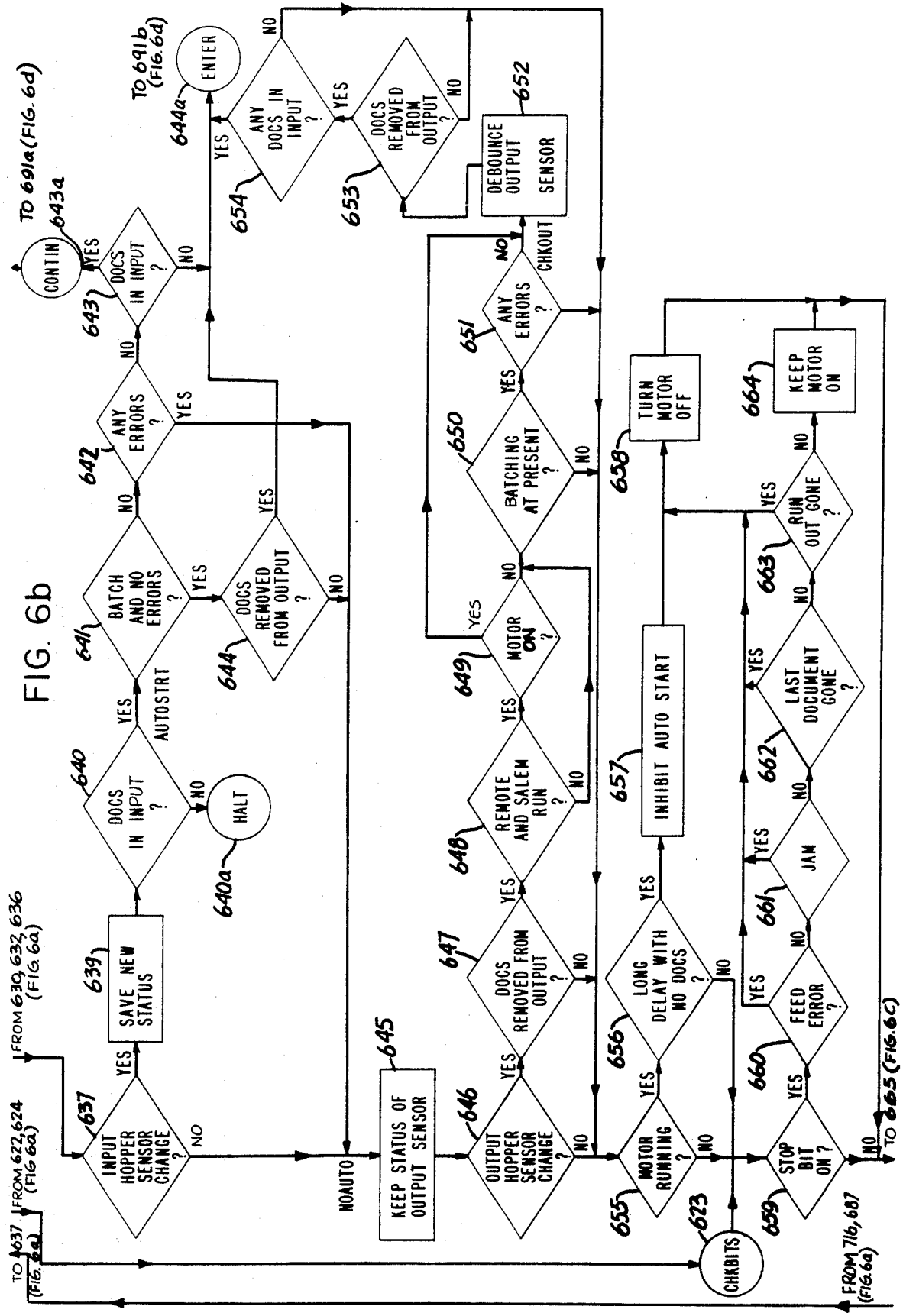

Turning to FIG. 6b, the input hopper sensor 34 is examined at 637 to see if any change has occurred. If any change has occurred, its new status is stored in memory at 639. The input stack sensor 34 is examined to see if notes are present at 640. If no notes are present, the operation is halted at 640a. If notes are present in the input, the apparatus is examined at 641 to determine if a batch has been completed (by comparing the batch count against the number of notes counted) and that there are no errors in the batch count. At step 644 the output stacker sensor 36 is examined to determine if notes have been removed from the output. If so, the program jumps to the ENTER step 644a to return the program to step 691b-FIG. 6d. If the notes have not been removed from the output, the program advances to step 645.

In the event that the batch has not been completed, the program branches to step 642 to determine if any errors are present. If errors are present, the program advances to step 645. If no errors are present, the program advances to step 643 to determine if there are any documents in the input and, if so, the program branches at 643a and advances to the continue step 691a in FIG. 6d.

As was mentioned hereinabove, if there has been either no input hopper sensor change, or if documents have not been removed from the output, or if any errors are present, the status of the output sensor is retained at step 645. The output hopper sensor 36 is again examined for a change at step 646. If notes are removed from the output stacker 28 when examined at step 647, the program advances to step 648 to determine if the apparatus is presently in the remote status and the SALEM is in the run state. If the answer is negative, the program advances to step 650 to determine if the apparatus 10 is in the batching mode. If the apparatus 10 is in the remote status and the SALEM is running, the motor 92 is examined at 649. If the motor is off, the apparatus is examined at step 650 to determine if the batching mode is present. If the motor is on, the debounce subroutine is initiated at step 652 for debouncing the output sensor 36 to prevent the motor 92 from being turned off for a delay period equal to the time required to count out the debounce counter.

If the apparatus is in the batching mode and any errors are present, the program advances to step 655. If no errors are present, the debounce subroutine is initiated at step 652 and advances to step 653. At step 653, the output sensor 36 is examined to determine if notes have been removed from the output stacker 28. If notes have not been removed from the output, the program advances to step 655. If notes have been removed from the output, and no notes are in the input, the program advances to step 655. However, if there are notes in the input, the program advances to step 644a and thereafter to step 691b of FIG. 6d to initiate the auto start, as will be described hereinbelow.

At program step 655, the motor is examined to determine its operating state. If the motor is running and there has been a long delay, during which no notes have been seen by the A and B counter sensors (step 656), the auto start condition is inhibited at 657 and the motor is turned off at 658. The program then advances to step 665.

In the event that the motor is found to be turned off at program step 655, the program searches for the cause of motor turn-off. At step 659, the stop bit is examined. If the stop bit is off, the program advances to step 665. If the stop bit is on, the program at steps 660–663 determines the cause of the stop, namely a feed error, jam, passage of the last note, or termination of the run out. If any of these conditions is present, the motor is turned off at step 658 and the program advances to step 665. If none of these conditions is present, the motor is maintained on and the program advances to step 665 (FIG.

6c). In the event that it is not yet time to decrement the counters, the program advances to step 671.

At step 665, an eight-bit counter which is continuously decremented at a predetermined rate, is examined. When the time to decrement has arrived, the counter is decremented at 666. At a predetermined count, the display is presented. When this count occurs (step 667) the DISPLAY routine is called at 668. If the count is not present, the program branches at 667a to examine the continuous counter. If the count is zero, the program advances to step 671. If the count is not zero, the keyboard lockout counter is decremented. The keyboard lockout counter is set each time the leading edge of a bill is detected and provides a delay interval during which every keyboard entry except for the stop key is ignored. The program then advances to step 671.

If the apparatus is in the local mode (step 671) and the motor 92 is on (step 675), the program advances to step 677. If the apparatus 10 is not in the local mode, the remote display is examined to determine if dashes are present at 672. If dashes are present in the remote display, the program advances to step 675. If not, the batch counter is cleared at 673 and the DISPLAY routine is called at 674 for providing dashes in the display 102. The DISPLAY routine is shown in FIG. 5 and will be described in detail hereinbelow.

As was mentioned hereinabove, the condition of the motor 92 is examined at step 675. If the motor is on, the NOTE POLL routine is called at step 676. If the motor is off, the program (at 677) determines if any notes detected by the NOTE POLL routine are present to be counted.

The NOTE POLL routine takes priority over the DISPLAY routine and tracks notes, regardless of whether the count is displayed, at the rate at which notes are tracked. As a result, a count of one or more notes may be accumulated at step 677 before the count in display 102 is updated. If there is at least one note to be counted, the accumulated count is decremented at 678. If it is the first note of the count, the remember note bit is reset and the key buffer is cleared (step 680). If it is not the first note, one count is added to the K (count) buffer used to store the accumulated count at 681. The DISPLAY routine is called at 682.

If the apparatus is not in the batch mode, i.e. if the bath value is zero, the program advances to step 687 (FIG. 6d).

If the batch value is other than zero, program step 684 looks to see if a batch has been completed. If so, the STOP routine is called and the batch bit is set at 685, the STOP BATCH routine (to be described below in connection with FIG. 5d) is performed at 685a, and the DISPLAY routine is called at 686, to generate an eight digit display "BACH XXXX". Thereafter, the program advances to step 687 (FIG. 6d). The apparatus 10 remains halted until the completed batch of sheets is removed from the output stacker 28 (FIG. 1).

Assuming that key conditions have been entered into the key stack and remain to be carried out, they are removed at step 688 (FIG. 6d) and examined, starting with step 689 which looks for the presence of a control key. If a control key is present in the key stack, during the program steps 690, 698 and 699, the key stack is examined to determine the presence of either a run, stop or continue key condition. In the event that the run condition is present, and notes are in the output stacker (step 691), the program branches at 691a to step 700. If no notes are present in the output, the program branches at step 691b to step 693, in which the auto start counter is initialized to just starting. If there is a key board entry, the START program (FIG. 5c) is called at 696. If not, the new batch value is stored at 695 and the START subroutine is thereafter called at 696. At program step 697 the K (count) buffer and error conditions are cleared and the one-half note and enter bits are set, then the program advances to step 716 at which step the DISPLAY subroutine is called. In the event that the STOP key has been operated, which condition is examined at step 698 and causes the auto start to be inhibited and the run out (of notes) to be eliminated at step 704 and causes a halt at 704a.

If the CONTINUE key has not been operated, which condition is examined at step 699, the program advances to step 693 which was described hereinabove. If the CONTINUE key has been operated, the program searches for a remote entry at step 700. If there is no remote entry at step 700, no keyboard entry at 701, no feed error at 702 and a batch count has not been reached, the auto start is initialized to the just starting condition at 705, the start routine is called at 706 and the error bits are cleared; whereupon the program advances to step 716 to call the DISPLAY routine. If any of the conditions of keyboard entry, feed error or batch completion has been detected at program steps 701—703, respectively, the auto start delay counter is initialized to the just started condition at step 693, as was described hereinabove.

If no control keys are present at the apparatus is operating in the remote mode, the DISPLAY routine is called at 716 from program step 707. If the apparatus 10 is not in the remote mode, the program branches at 707a to step 708 which clears any errors stored and clears the batch value. The keyboard is examined at 709 to determine if a preset batch is present. If so, the new batch value is stored at step 712 and the DISPLAY routine is called at 716. If the keyboard is not set at a preset batch and the first digit is present, the keyboard buffer is cleared at 713. If the first digit is not present, the program branches at 710a to determine if there is room for a digit at step 711. If the digit is the first digit, the key buffer is cleared, the DISPLAY routine is called at 716. If so, the digit is saved and the keybuffer entry bit is reset at 714 and the STOP subroutine is called at 715. The keybuffer enter bit identifies the fact that the first digit has been entered. This is examined at step 710.

The NOTE POLL routine is shown in FIGS. 7a–7e and is called at step 676 (FIG. 6c) after all of the desired keyboard inputs have been entered and examined and indicates that counting can proceed.

Figure 7A:
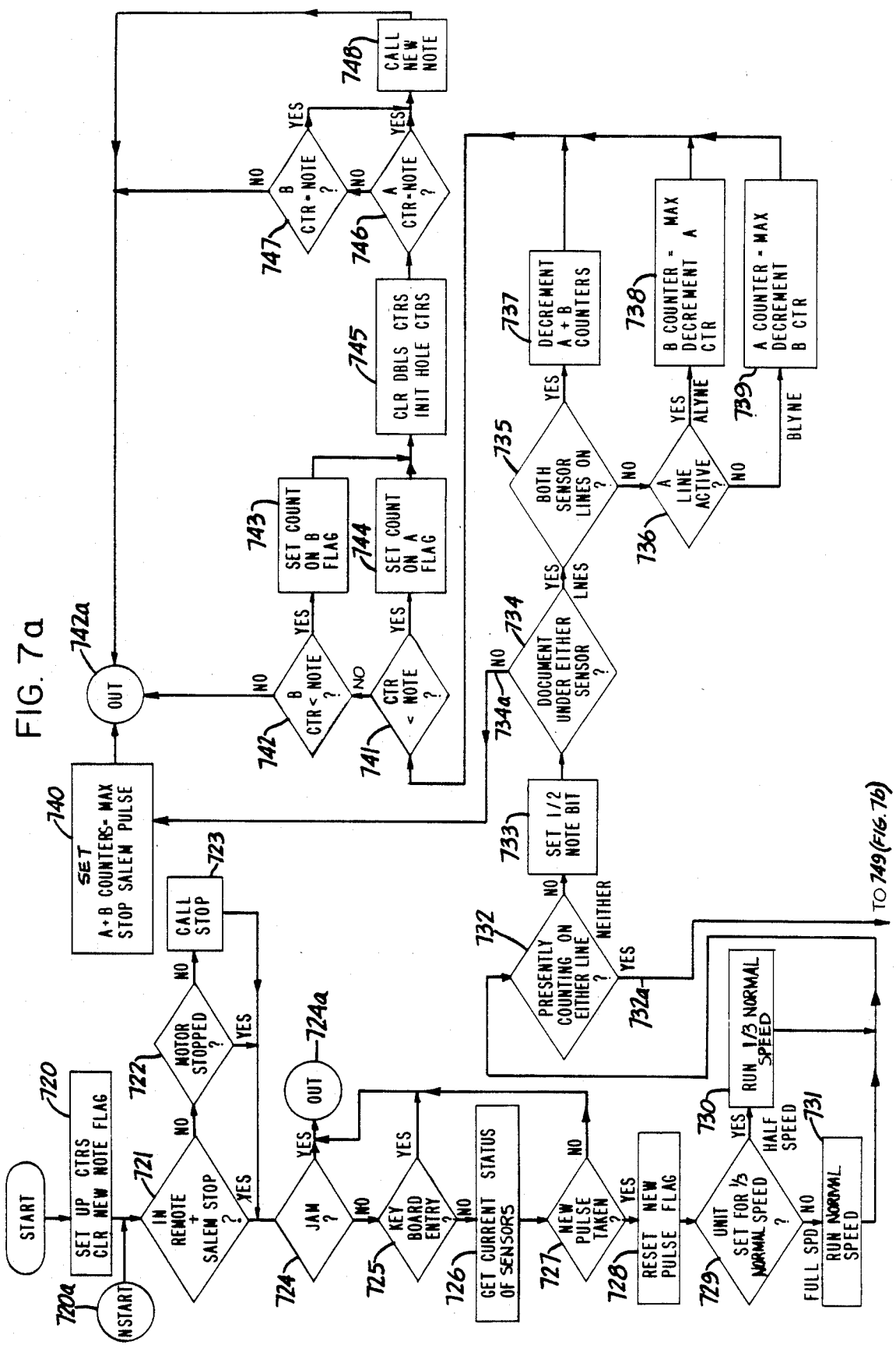

The NOTE POLL subroutine is initiated at step 720 in FIG. 7a. Noting FIG. 1a, each sheet S of paper currency is advanced through the apparatus 10, shown in FIG. 1, in the direction shown by arrow A and is arranged to pass between the sensors 32, 32' and the associated LEDs 30, 30'. The presence of gaps between sheets indicated by light of substantially maximum intensity, while the movement of a note (whether single, double or multiple fed) is indicated by a significant drop in the intensity of light reaching sensors 32, 32', which drop in intensity is a function of the transmissivity of each sheet and the number of sheets moving between the light sources 30, 30' and the associated light sensing elements 32, 32'. Each sensor 32, 32' is associated with three counters, single, double and hole, in microprocessor 52, sensor 32 being associated with counters "A" and sensor 32' being associated with single, double and hole counters "B". When a sheet is passing between the light source 30 and cooperating light sensing element 32 associated with the counter, pulses are applied to the counter. If ninety or more counts are accumulated, the document is identified as being "long". Pulses are applied to the counters at a rate of one every millisecond when counting at normal speed and a rate of one every three milliseconds when counting at one-third normal speed. In the preferred embodiment, the A and B counters are set to a maximum value (i.e. 90) and are decemented toward zero. The occurrence of three successive counts (i.e. a count of 87) is interpreted at the presence of a note.

The occurrence of five successive hole counts is interpreted as the presence of a gap between sheets. These counts are accumulated in a hole counter provided for each of the A and B lines (see FIGS. 3a–3r). Less than five counts is interpreted as a hole in a note. The accumulation of five counts during a doubles condition is interpreted as the presence of double fed sheets. These counts are accumulated in a double counter provided for each of the A and B lines (FIGS. 3a–3r).

The NOTE POLL routine begins at step 720, at which time all of the above-mentioned counters are reset and the new note flag is cleared. If the SALEM has called for a stop when the apparatus 10 is in the remote mode, and a jam condition has been detected, at steps 721 and 724, respectively, the OUT subroutine is called at 724a. If the SALEM is not in the stop condition during the remote mode, and the motor 92 has not stopped, the STOP subroutine is called at 723. If the motor has stopped, or after the STOP routine is completed, the jam bit is examined to see if a jam condition is present at step 724. If there is no jam condition and a keyboard entry is detected at step 725, the program jumps to the OUT subroutine at step 724a. If no keyboard entry is detected, the current status of the sensors (32, 32') is determined at 726.

The A and B counters are examined at step 732. If either counter is counting, the program advances to step 749, shown in FIG. 7b, as will be more fully described. If neither line is presently counting, the one-half note bit is set at 733. This bit is stored in a predetermined one of the scratch pad memory locations. If a document is present under either sensor at 734 and if both sensor lines are on as detected at step 735, both A and B counters are decremented by one count at 737 and the program advances to step 741. When only one sensor line is on, if only the A line is active (i.e. covered), the B counter is set to maximum count and the A counter is decremented. If the A line is not active, the A counter is set to maximum and the B counter is decremented, whereupon the program advances to step 741.

In the event that a document is not under either sensor, the program branches at 734a, both A and B counters are set to their maximum count and pulses to the SALEM are terminated at 740, at which time the program advances to the OUT subroutine at 742a.

After one or both of the A and B counters have been decremented at any of the steps 737 through 739 and the A counter has a count less than one note (i.e. 87 or less), the A count flag is set. If the count in the A counter is not less than one note, and the count in the B counter indicates a count of less than one note, the B count flag is set at 743. If the B counter indicates a count of less than one note (i.e. less than 87), the OUT subroutine is called at 742a.

As soon as one of the A or B count flags is set. The program then advances to step 745, whereupon the A and B doubles counters are cleared and the A and B hole counters are initialized. The A and B count flags indicate which counter arrived at the count of 87 first. The A and B counters are examined at 746 and 747 to determine if their count is equal to the count for one note (i.e. 87). If the A counter has a count equal to one note, the NEW NOTE subroutine is called at 748. If the A counter is not equal to one note but the B counter is equal to one note, the NEW NOTE subroutine is called at 748. If neither the A nor the B counter has a count equal to one note, the program advances to the OUT subroutine at 742a, as will be more fully described. The count 87 is the only count which will call the NEW NOTE routine, i.e. which will add one note to the count.

Figure 6C:
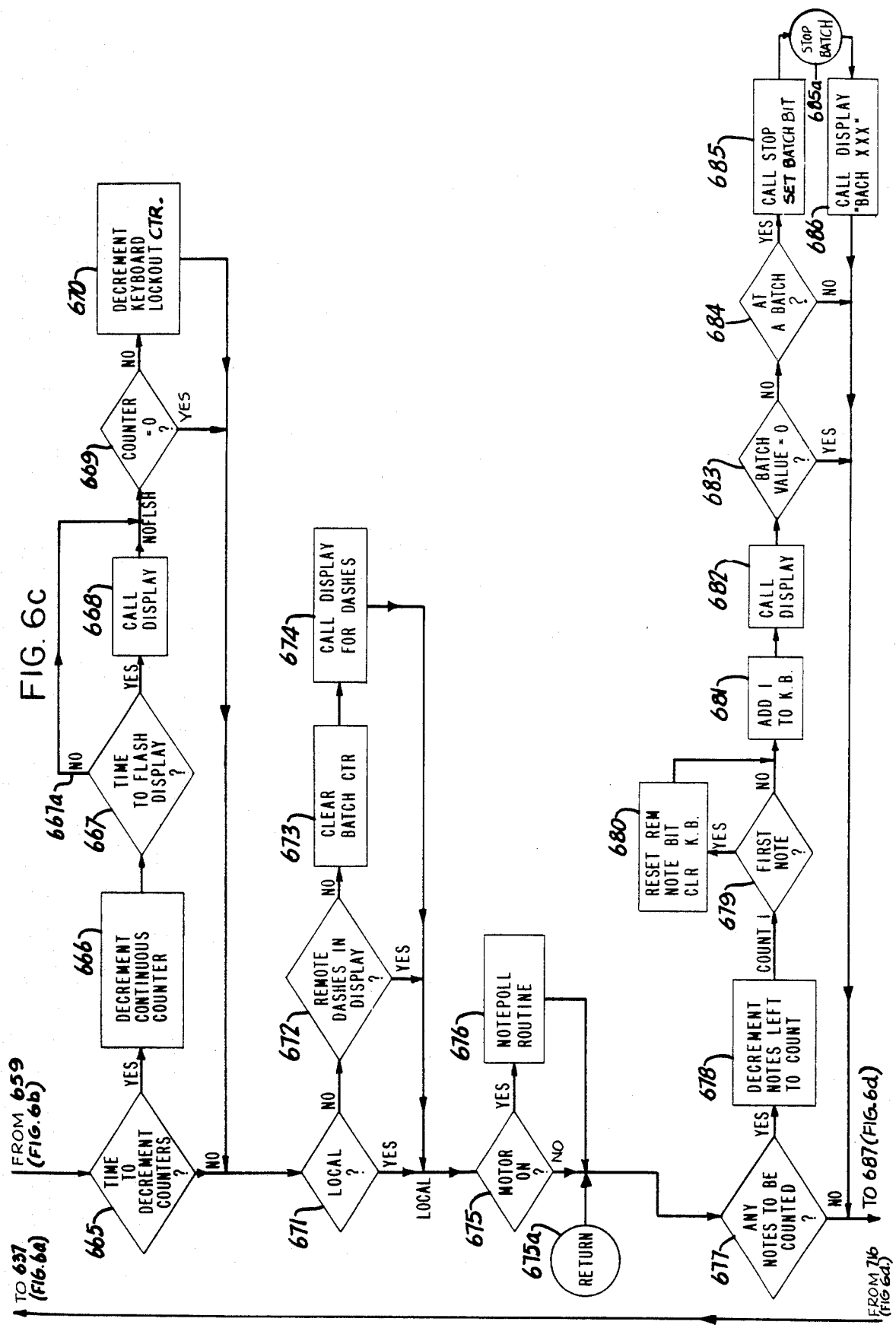
Figure 7B:
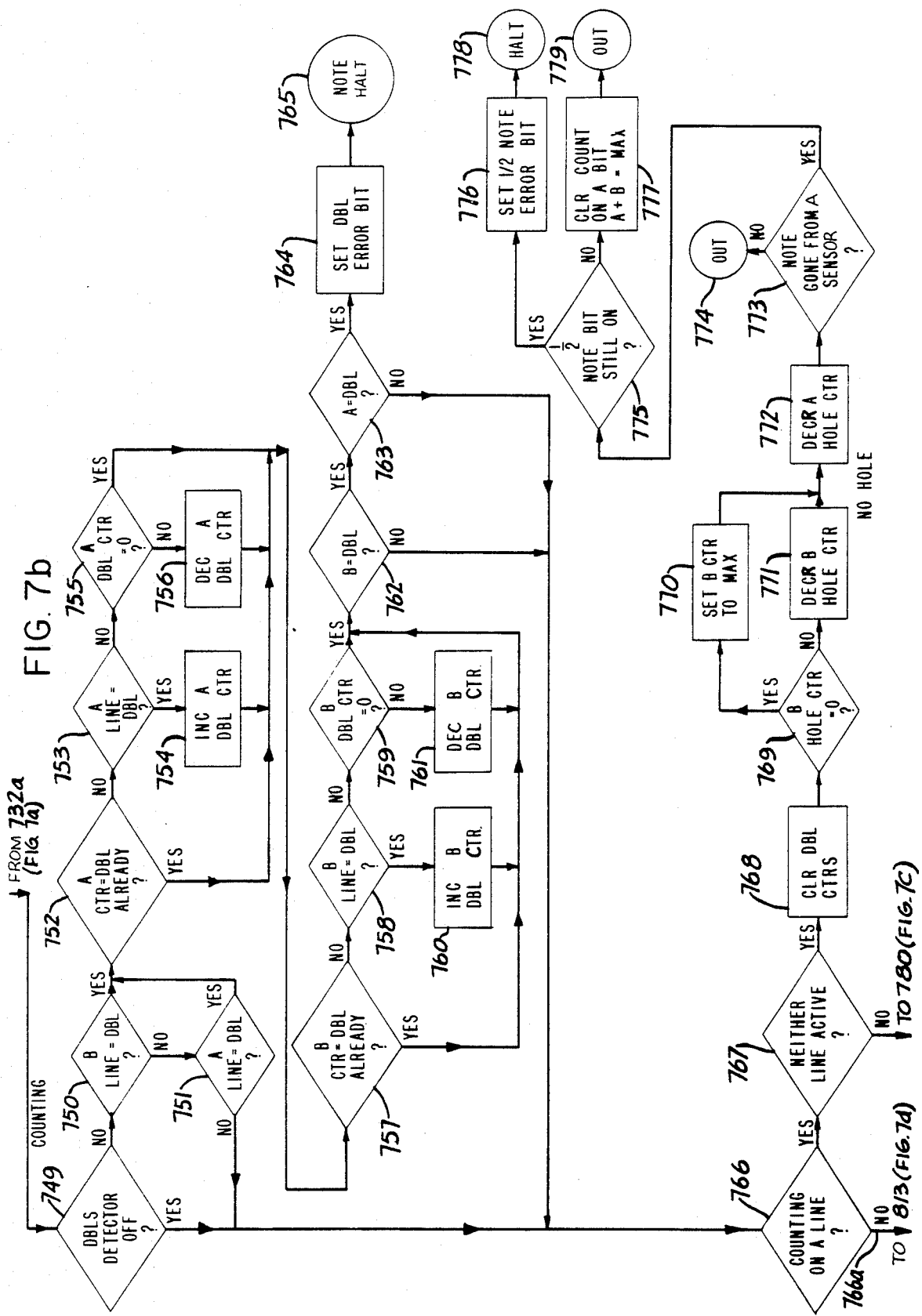

If counting on either line is taking place when examined at program step 732, the program branches at 732a to program step 749, shown in FIG. 7b. If the doubles detector is on, and either the B line or the A line indicates a double feed condition at steps 750 and 751 respectively, the A double counter is examined at step 752 to determine whether a double count, (i.e. 5), has already been accumulated. If so, the program advances to step 757 wherein the same examination is made of the B double counter. If the B double counter indicates a double count, then at steps 762 and 763 the presence of these simultaneous double conditions cause the double error bit to be set at 764, whereupon the program advances to the NOTE HALT subroutine, shown in FIG. 8a, which subroutine, as will be more fully described, sets the appropriate error bit and then returns to the program, as shown in FIG. 6c.

In the event that either the A or the B double counter has not reached a double count (see program steps 752 and 757), the A and B line sensors are examined for a double condition at 753 and 758. If the double condition is present, the respective double counter is incremented. If the double condition is not present and the double counter is not equal to zero, the respective counter is decremented.

In the event that either one or both of the A and B double counters has not reached a double count, the program advances to step 766. If counting is occurring on the A line, and neither line is active, i.e. neither sensor is covered (step 767), the double counters are cleared at 768 since this indicates the presence of a "hole" condition at both sensors. The B hole counter is examined at 769. The hole counters in the preferred embodiment are set to a count of 5 and are decremented towards zero. A zero count indicates the presence of a gap between notes.

If the count in the B hole counter is zero, the B counter is set to maximum in readiness for counting the next note. This technique enables even skewed notes to be accurately counted. If the count in the B-hole counter is not equal to zero, the B-hole counter is decremented. These operations take place in program steps 770 and 771. Thereafter, the A-hole counter is decremented and the A-sensor is examined at 773. If a note is no longer covering the A-sensor and the half-note bit is still on (at program step 775), the half-note error bit is set at 776 and the apparatus is halted at step 778. If the half-note bit is not on, the A count bit is cleared and the A and B counters are set to maximum, whereupon the program jumps to the OUT subroutine at 779.

If one of the A and B lines is found active (i.e. the associated sensor is covered) at step 767, the program advances to program step 780 (FIG. 7c), at which time both lines A and B are examined to determine if they are active. If both lines are active, i.e. both sensors are covered, the half-note bit is reset at step 781, both hole counters are initialized to their maximum count and the A-counter is decremented. The A-counter is examined at step 782 and if the count indicates a long note, the program jumps to the JAM routine at 788. If the count does not indicate the presence of a long note and indicates the presence of a count equal to a note (at step 783), the NEW NOTE routine is called at 784. If the count in the A-counter is not equal to the note count (87), the B-counter is decremented and is then examined to see if its count is that for a long note or is equal to the note count (87) at steps 786 and 789. If a long count is present, the JAM subroutine is called at 787. If the long count is not present, and a note count is present, the NEW NOTE subroutine is called and the program jumps to the OUT subroutine at 791. The program jumps to the OUT sub-routine directly if the B-counter fails to indicate the count of a note. It should be noted that the NEW NOTE subroutine sets both the A and B counters to a count of NOTE−1 (i.e. 86) to prevent the B counter from giving a count (step 789) after the A counter has given a count (step 783) for the same sheet.

In the event that only one of the A and B lines are active when examined at step 780, the program advances to step 792 to examine the A-line sensor. If the A-line is active, i.e. if the A line sensor is covered by a note, and the half-note bit is set, the A-hole counter is initialized (set to maximum) at 798, the A-counter is examined at 799 to see if the count equals a note and if so, the NEW NOTE subroutine is called at step 800. If the count is not equal to the count for a note, the A-counter is decremented at 801. If the count in the A-counter is equal to a long count when examined at step 802, the program jumps to the JAM sub-routine at 803. If a long count is not present, the program jumps to the OUT subroutine at 804.

Returning to step 794, if the B hole counter is not zero, it is decremented (since only the A line is covered) at 795. If the B hole counter becomes zero (at step 796) after being decremented, the B counter is reset to maximum at 797. If the B hole counter has not yet reached zero, the A hole counter is initialized at 798.

In the event that the A-line is not active, the program branches at 792a to step 805, at which time the half-note bit is reset and the B-counter is decremented. If the B-counter contains a long count at step 806, the program jumps to the JAM subroutine at 807. If the B-counter does not contain a long count, the program examines the A-hole counter at step 808. If the count equals zero, the A-counter is set to maximum and the pulse to the SALEM device is stopped at 811. Thereafter, the B hole counter is initialized and the program advances to the OUT subroutine at step 804.

In the event that the count in the A-hole counter is not equal to zero, the program branches at 808a, the A-hole counter is decremented at 809, and if the A hole counter steps from one to zero, the program advances to program step 811, as was previously described. If the count in the A hole counter is greater than zero, the B-hole counter is initialized at 812 and the program jumps to the OUT subroutine at 804.

Figure 7D:
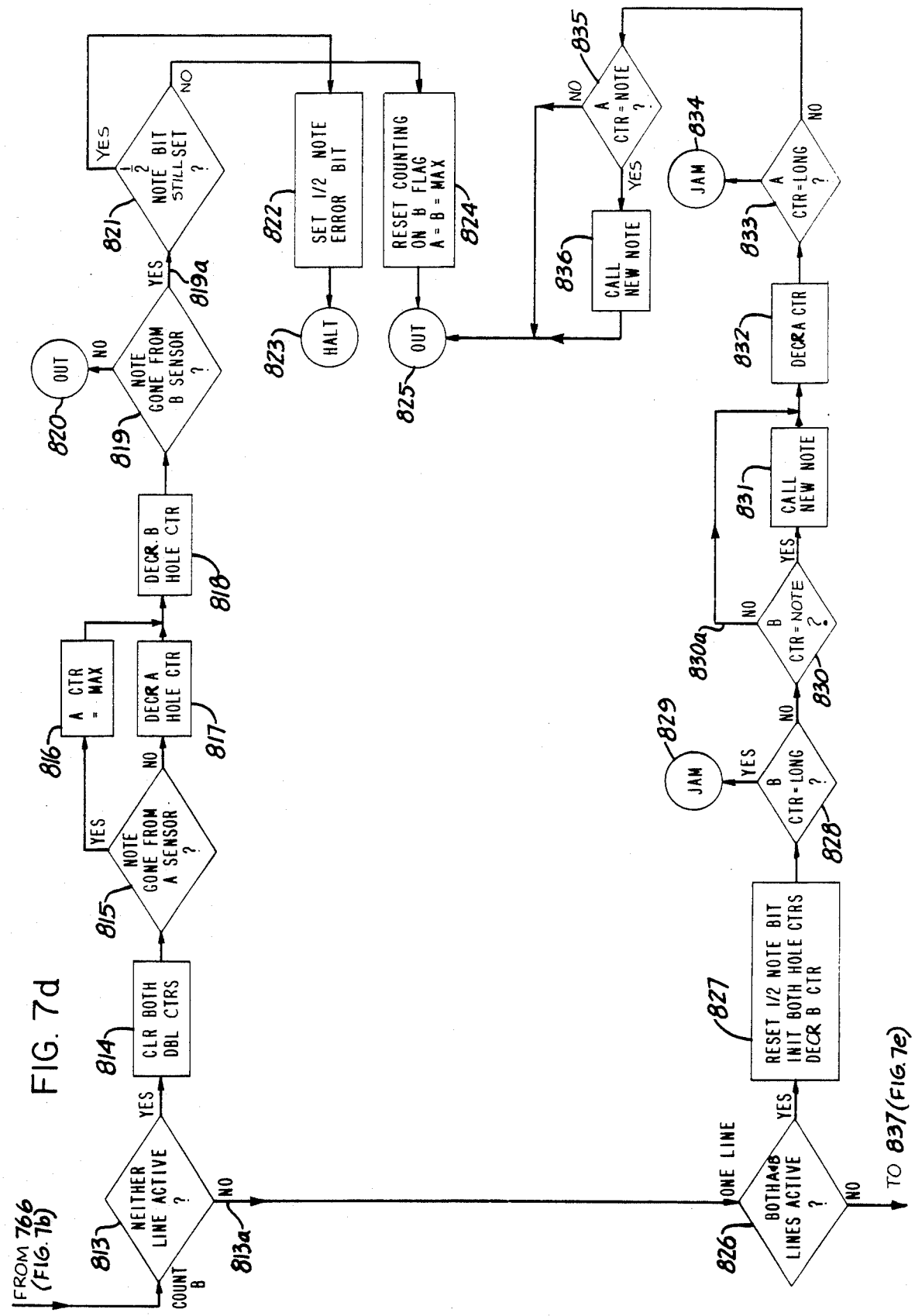

Returning to the program step 766 (FIG. 7b), if the A-line is not counting, the program branches at 766a to program step 813 in FIG. 7d. Both the A and B line sensors are examined. If neither is active, both double counters are cleared at 814, and the A-sensor is examined. If the A hole counter note has decremented from one to zero, the A-counter is set to maximum. If the count is one or more, the A-hole counter is decremented, said operations occurring at program steps 816 and 817. Thereafter, the B-hole counter is decremented at 818, and the B hole counter is examined at 819 and if it has not decremented from one to zero, the program jumps to the OUT subroutine at 820. If the note is gone from the B-sensor, the program branches at 819a, whereupon the half-note bit is examined at 821. If the half-note bit is still set, the half-note error bit is set at 822 and the apparatus 10 is halted at 823. If the half-note bit is not set, the B-flag counting bit is reset and the A and B counters are set to maximum at step 824 in readiness for counting the next note, whereupon the program advances to the OUT subroutine at 825.

In the event that at least one sensor line is active when examined at step 813, the program branches at 813a to step 826, at which time both A and B line sensors are examined. If both lines are active, the half-not bit is reset, the A and B hole counters are initialized and the B-counter is decremented. If the B-counter when examined at step 828 contains a long count, the program jumps to the JAM subroutine at 829. If the B-counter does not contain a long count, but contains a count equal to a note (at step 830), the NEW NOTE subroutine is called at 831. If the count in the B-counter is not equal to a note, the program branches at 830a to step 832, whereupon the A-counter is decremented. The A-counter is examined at 833. If the count is equal to a long document, the program jumps to the JAM subroutine at step 834. If the A-counter does not contain a long count, the A-counter is examined at step 835 to determine if it contains a count equal to a note. If not, the program jumps to the OUT subroutine at 825. If the A-counter contains a count equal to a note, the NEW NOTE subroutine is called at 836 and thereafter advances to the OUT subroutine. As set forth above, the NEW NOTE routine called at 831 prevents the NEW NOTE routine from being called at 836 by setting the A and B counters to counts of "86".

Figure 7E:
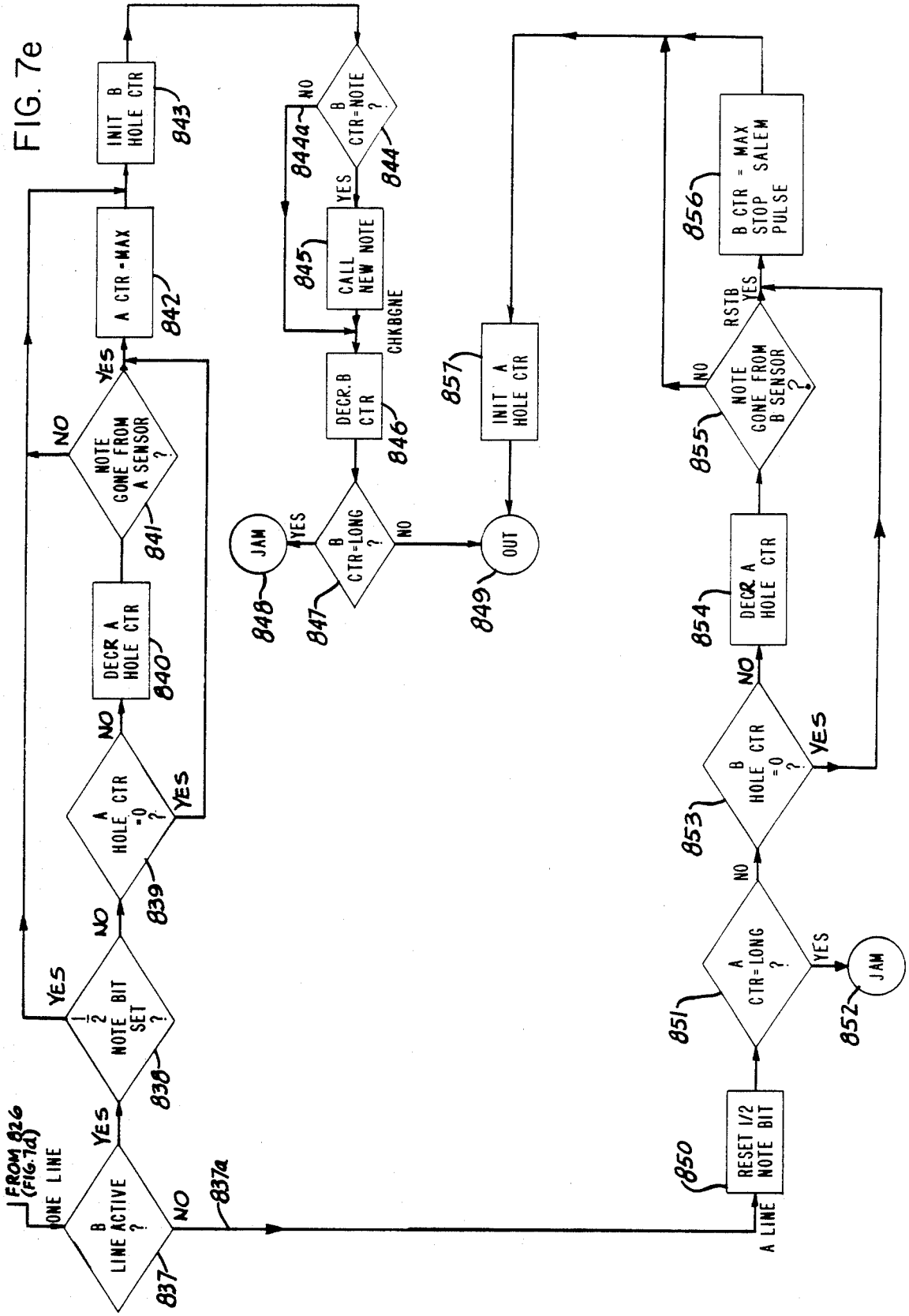

Returning to program step 826, if the examination of the A and B lines indicates that both lines are not active, i.e. the sensors 32, 321 are not covered, the B-line is examined at step 837, as shown in FIG. 7e, to determine if it is not active.

Program steps 826 through 849 (FIGS. 7d and 7e) are substantially identical to program steps 780 through 804 (FIG. 7c). If the B-line is active, the half-note bit is examined at step 838. If the half-note bit is set, the B-hole counter is initialized at 843, and the B counter is examined at 844. If the count is equal to a note, the NEW NOTE sub-routine is called at 845, the B counter is decremented at 846, and the B-note counter is examined at 847 to determine if a long count is present, and if so, the JAM subroutine is called at 848, and if not, the OUT subroutine is called at 849. In the event that the B-note counter does not contain a count equal to a note at step 844, the routine branches at 844a to decrement the B counter at 846 and then to again examine the B counter for a long count at step 847, as was described hereinabove.

If the B-line, when examined at step 837, indicates that the B-line is not active, the program branches at 837a to step 850 to reset the half-note bit. The A counter is examined at 851. If a long count is present, the program advances to the JAM subroutine at 852. If a long count is not present, the B-hole counter is examined at 853. If the B-hole counter is at a zero count, the B counter is set to maximum and the SALEM pulse is stopped at step 856. If the count in the B-hole counter is not equal to zero, the A-hole counter is decremented at 854, and the B-hole counter is examined at step 855 to determine if the B-hole counter has decremented from one to zero. If so, the program advances to step 856 as was previously described. If the B-hole counter is one or greater, the program advances directly to step 857 which initializes the A-hole counter and then steps to the OUT subroutine.

Figure 8A:
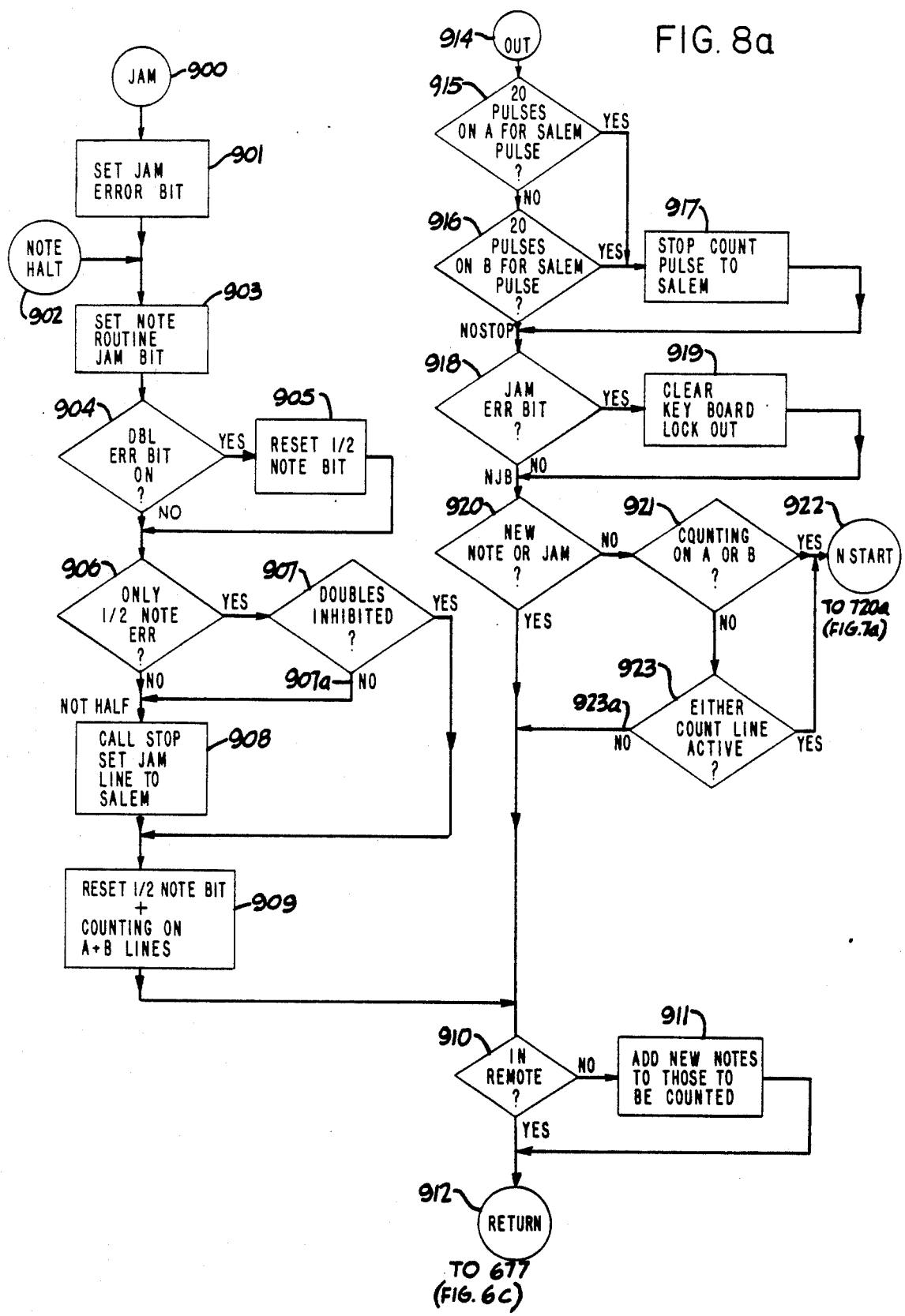
Figure 8B:
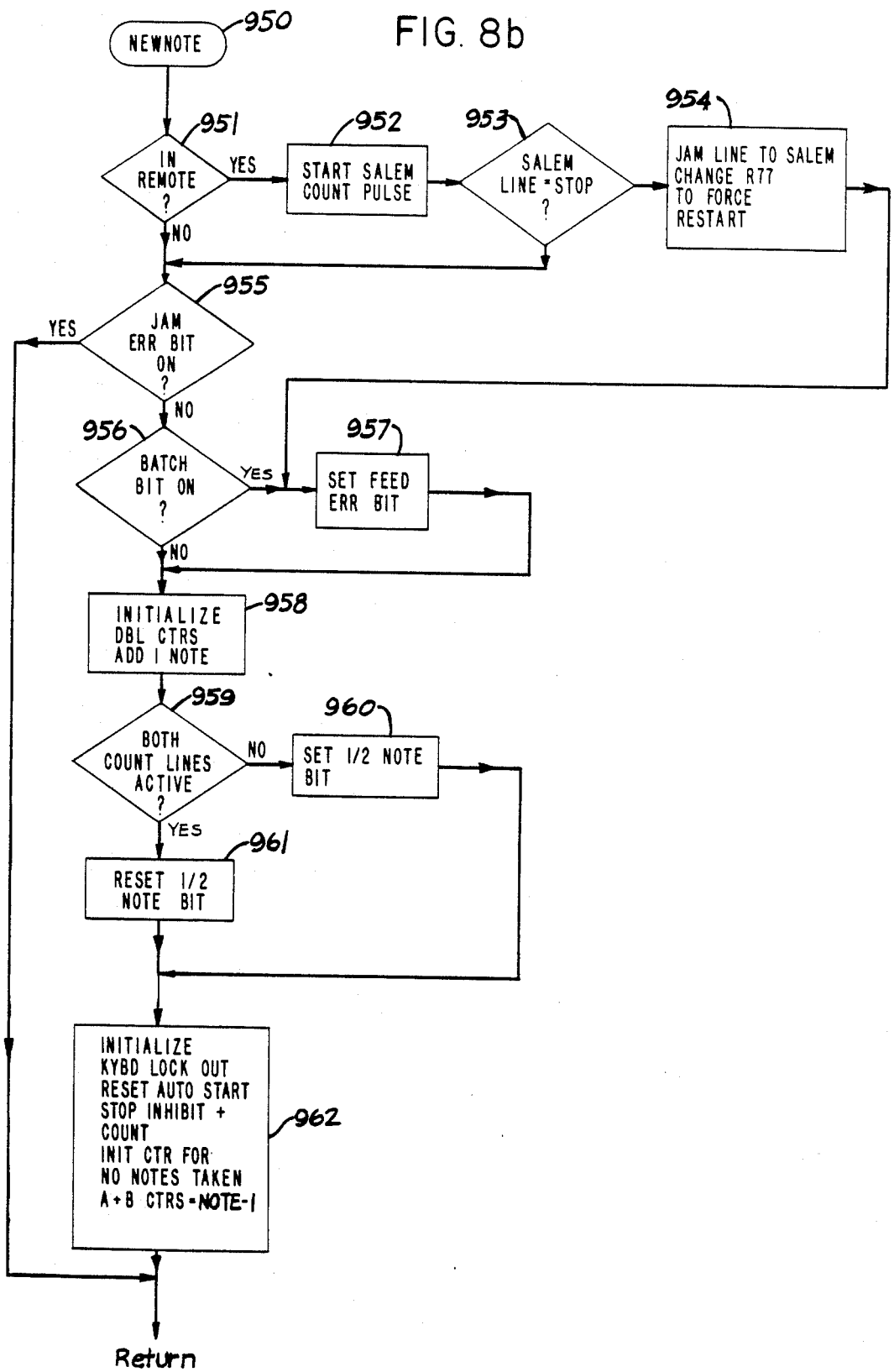

The JAM sub-routine is shown in FIG. 8a and, whenever the JAM subroutine is called, the program is entered at step 900 and thereafter to step 901, at which time the jam error bit is set. At step 903, the note routine JAM bit is set and the double error bit is examined at 904. If the double error bit is on, the one-half note bit is reset at step 905. If the double error bit is not on, the program branches to step 906 to determine if a half-note error is present. If a half-note error is present, and the doubles are found to be inhibited at 907, the half-note bit is reset and the A and B counting bit is reset. If the doubles counting has not been inhibited, the program branches at 907a to step 908, where the STOP routine is called and the jam line to the Salem is set. Thereafter, the program advances to step 909 as was previously described, and then to step 910 which examines the apparatus 10 to determine if the apparatus is in the remote mode. If the apparatus is in the remote mode, the program advances to the RETURN step 912 which in turn causes the program to jump to the RETURN step 675a of FIG. 6c, at which time the program determines if there are any further notes to be counted at step 677 of FIG. 6c.

The OUT subroutine which is also shown in FIG. 8a is initiated at step 914 which advances to step 915 to determine the count accumulated by the A counter. If 20 pulses have been accumulated, the count pulse to SALEM is terminated at 917. If, in the alternative, 20 pulses have been accumulated on line B as examined at step 916, the count pulse to SALEM is terminated. This assures adequate separation between count pulses delivered to SALEM by the microprocessor 52 to assure accurate counting by SALEM. If neither the A nor the B counters have accumulated 20 pulses, the program advances to step 918 to examine the jam error bit. If the jam error bit has been set, the keyboard lockout is cleared at step 919. If the jam error bit is not set, the program advances to step 920, at which time the apparatus is examined for either a new note or a jam condition. If either of these conditions occur, and the system is in the remote mode as examined at step 910, the program leaves the OUT routine at 912 and returns to update the note count and call the DISPLAY routine at step 677 of FIG. 6c. If a new note or jam condition is not present, the lines A and B are examined to determine if counting is still occurring at step 921. If counting is still occurring, the program branches at 922 to program step 720a shown in FIG. 7a to reinitiate the NOTE POLL routine. If counting is not occurring on either the A or the B line, but if either count line is active, as examined at step 923, the program advances to the NOTE START routine at 922. If neither count line is active, the program branches at 923a to program step 910, as was previously described.

At the START subroutine shown in FIG. 5c, the program jumps to step 550, at which time the return address is stored and the SALEM run/stop line is examined. At step 552, the local/remote switch status is examined. If the switch is not in the remote status, the program branches at 552a to 554 to complement the SALEM run/stop status to the local/remote status of the apparatus 10.

In the event that the switch is in the remote status, the program branches to step 554 to examine the status of the SALEM. In the event that the SALEM is not at the run state, the program returns to the main start program to initiate program step 612.

The call STOP program step 609 causes the program to advance to the STOP subroutine shown in FIG. 5b, causing the selection of program step 540, at which time the return address at the time of the jump is stored, the stop bit is set and the automatic stop/start counter is initialized for run out. The program then returns to program step 612.

The SERVICE routine is called by a time-out of a timer which may, for example, be any one of the counters 52-7 through 52-n shown in FIG. 2b which form part of the random access memory of microprocessor 52. The timer is set for an interval of one millisecond. Upon time-out an interrupt condition is generated, halting whatever routine (or sub-routine) is in progress and automatically jumping to the SERVICE routine.

The SERVICE routine is entered at step 1030 a which time the identity of the step that was interrupted is remembered. The routine then advances to step 1031 where the contents of the accumulator, status register and ISAR are saved. The status register stores bits representing the carry of a sum operation, the results of a compare operation, etc. The ISAR is the pointer to the scratch pad memory (RAM).

At 1032, the two byte keyboard lock-out counter is examined, if it has not stepped to zero, the low byte of the keyboard lockout counter is decremented. If the low byte has stepped to zero (step 1034), the high byte is decremented at 1035. If the low byte is zero or after the high byte is decremented, the flag for the new pulse is stored (in a location in one register of the scratch pad memory). The speed switch is examined at 1037. If at one third normal speed the timer is set to sample the A and B sensors every 3 milliseconds (at 1038). If set to normal speed, the timer is set to sample the sensors every millisecond (at 1039). The timer is initialized, the contents of the ISAR is restored, as is the status register and the accumulator (at 1040). Upon completion of the SERVICE routine, the program jumps back to the step that was interrupted when the timer timed out, the identity of the interrupted step being the step saved at step 1030. Since the timer is initialized again at step 1040, there will be another interrupt and a jump to the SERVICE routine the next time the timer times out, i.e., one millisecond after being initialized (i.e. reset). This operation repeats itself every millisecond. The SERVICE routine is executed within one-tenth of a millisecond. Thus, the microprocessor 52 tends to the other routines during the other nine-tenths of each millisecond. In other words, ninety percent (90%) of the operating time is allocated to all routines other than the SERVICE routine and the SERVICE routine is performed during the remaining ten percent (10%) of the time. The SERVICE routine thus assures that operation of all other routines is updated every millisecond, the updating operating requiring only one tenth of a millisecond (i.e. 0.1 msec.).

Figure 5D:
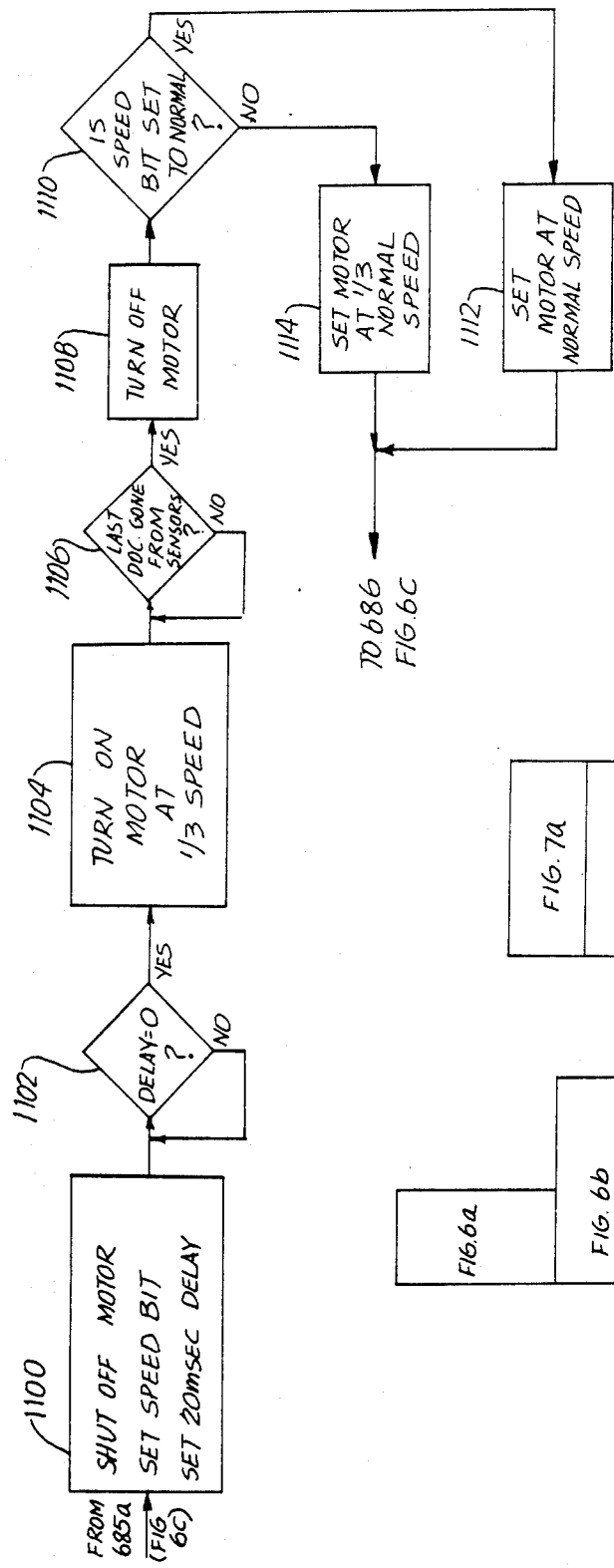

FIG. 5d shows the STOP BATCH routine 685a of FIG. 6c in greater detail. When the count of notes equals the count of the present batch quantity 684 and the STOP routine has been called and the batch bit has been set (685), the routine branches at 685a to step 1100 whereupon the motor 92 is turned off, a speed bit is set to remember the operating speed, and a delay period is begun by initializing and decrementing a counter. Thus, counting occurs during the braking mode. When the counter reaches a predetermined count (20 msecs—step 1102) the motor 92 is turned on to operate at one third normal speed. At this time, the note is still covering sensors 32, 32'. When the note passes the sensors 32, 32' (step 1106), the motor is turned off. The program then returns to program step 686, FIG. 6c. This routine assures accurate feeding and stacking of a batch by braking the motor M when the A and/or B counters reach a count of 87 and resetting the motor 92 to operate at one third normal speed and shutting off the motor after the note has passed the sensors 32, 32' to assure the completion of a batch well before the note for the next group of notes to be counted is advanced to the output stacker 28.

Although the flow diagrams adequately describe the operation of the sensing and control electronics, a program listing has been provided and accompanies this specification. The language is assembly language for use in programming the F8 processor manufactured by both Fairchild and Mostek. The data is stored in hexadecimal format.

The program listing is comprised of four modules, i.e., KEYENTER (steps 0000 to 0300); KEYSCAN (steps 0302 to 0468); NOTEPOLL (steps 0469 to 07A0); and LOOKUP (steps 07A2 to 07FF).

The columns of each module, reading from left to right identify: memory address; the OP Code (operating code); line number; operation to be performed; operand; and programmer's comments. The asterisks aid in the visualization of program segments within each module.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for counting sheets normally moving along a path in single file in spaced apart fashion past a pair of sensors arranged a spaced distance from one another along an imaginary line transverse to the path of movement, comprising the steps of:
    sampling both sensors at regular spaced time intervals;
    developing a first count for each sensor when a sheet is passing the sensor when sampled;
    developing a second count for each sensor when no sheet is passing the sensor when sampled;
    indicating one sheet as being present when the first count associated with either sensor reaches a first predetermined quantity;
    resetting the first count of a sensor when the second count associated therewith reaches a second predetermined quantity.

2. The method of claim 1 further comprising the step of identifying a jam condition when the first count for either sensor reaches a third predetermined quantity different from said first predetermined quantity.

3. The method of claim 2 wherein the step of identifying a jam condition further includes the steps of halting the feeding of sheets and providing a visual display of the error condition.

4. The method of claim 1 further comprising the steps of:
    reducing the second count for each sensor each time a sheet is passing the sensor when sampled only when the value of the second count is greater than zero and less than said second predetermined quantity.

5. The method of claim 1 further comprising the step of identifying a third count for each sensor when a double thickness sheet is passing the associated sensor when sampled;
    identifying the presence of a double feed condition for a sensor when the third count associated with the sensor reaches a fourth predetermined quantity;
    resetting the third count for each sensor when no sheet is passing the sensor; and
    identifying a double feed error condition only when third counts of both sensors have reached said fourth predetermined quantity.

6. The method of claim 5 wherein the step of identifying a double feed error condition further includes the steps of halting the feeding of sheets and providing a visual display of the double feed condition.

7. The method of claim 5 wherein the resetting of the third count further comprises the step of clearing a double count for a sensor when the second count associated with the sensor generating the third count reaches said second predetermined quantity.

8. The method of claim 1 further comprising the step of storing a condition identifying a possible half-sheet condition when a sheet is passing only one of said sensors when sampled;
    removing the stored condition if a sheet is passing both sensors when sampled;
    identifying the presence of a half-sheet condition if the possible half-sheet condition is still being stored when no sheets are passing the sensors.

9. A method for operating a document handling and counting apparatus having an input location for receiving a stack of sheets to be counted; an output location for receiving sheets after they are counted, and motor driven handling means for removing sheets from the input location, separating the sheets and feeding the separated sheets to the output location and having manually operable start and stop controls, said method comprising the steps of:
    starting the motor driven handling means when the start control is operated;
    sensing the input location for the presence or absence of sheets;
    stopping the motor driving handling means when no sheets are in the input location;
    starting a delay interval when sheets are again placed in the input location; and
    starting said motor driven handling means upon termination of the delay interval.

10. The method of claim 9 wherein the delay interval is obtained by generating timing pulses, counting the pulses at the start of the delay interval and energizing the motor driven handling means when the pulse count reaches a predetermined value.

11. The method of claim 9 further comprising the step of initiating a second delay interval having a predetermined time period by counting a predetermined number of timing pulses when the input location is empty; and resetting the second delay interval by resetting the count being developed representing the second delay interval when sheets are placed in the infeed location before the second delay interval is terminated; and deenergizing the motor driven handling means when the second delay interval has terminated and the input location is empty.

12. The method of claim 9 further comprising the step of counting the sheets passed to the outfeed location.

13. The method of claim 11 further comprising the step of displaying the count.

14. The method of claim 11 further comprising the step of deenergizing the motor and retaining the count of sheets when the sheets fed to the output location are removed.

15. The method of claim 11 wherein said apparatus includes a batch mode switch having an on and off position and a batch count storage means further comprising the step of deenergizing the motor driven handling means when the quantity of sheets counted equals the quantity stored in the batch count storage means and the batch mode switch is in the on position.

16. The method of claim 15 further comprising the step of retaining the count in the display when sheets are removed from the output location, and resetting the count of sheets when sheets are placed in the infeed location.

17. The method of claim 14 further comprising the step of retaining the count of sheets when the input location is empty, while the output location contains sheets and the count is less than the quantity stored in the batch count storage means.

* * * * *